(12) United States Patent
Da Silva Pratas Gabriel et al.

(10) Patent No.: US 11,438,610 B2
(45) Date of Patent: Sep. 6, 2022

(54) BLOCK-LEVEL SUPER-RESOLUTION BASED VIDEO CODING

(71) Applicants: KONINKLIJKE KPN N.V., Rotterdam (NL); NEDERLANDSE ORGANISATIE VOOR TOEGE-PAST-NATUURWETENSCHAP-PELIJK ONDERZOEK TNO, s-Gravenhage (NL)

(72) Inventors: Alexandre Da Silva Pratas Gabriel, The Hague (NL); Emmanuel Thomas, Delft (NL)

(73) Assignees: Koninklijke KPN N.V., Rotterdam (NL); Nederlandse Organisatie Voor Toegepastnatuurwetenschappelijk, 'S-Gravenhage (NL)

( * ) Notice: Subject to any disclaimer, the term of this patent is extended or adjusted under 35 U.S.C. 154(b) by 0 days.

(21) Appl. No.: 17/044,528

(22) PCT Filed: Apr. 12, 2019

(86) PCT No.: PCT/EP2019/059569
§ 371 (c)(1),
(2) Date: Oct. 1, 2020

(87) PCT Pub. No.: WO2019/197674
PCT Pub. Date: Oct. 17, 2019

(65) Prior Publication Data
US 2021/0211643 A1   Jul. 8, 2021

(30) Foreign Application Priority Data
Apr. 13, 2018 (EP) .................................... 18167361

(51) Int. Cl.
*H04N 19/33* (2014.01)
*H04N 19/119* (2014.01)
(Continued)

(52) U.S. Cl.
CPC ........... *H04N 19/33* (2014.11); *G06T 3/4046* (2013.01); *G06T 9/002* (2013.01); *H04N 19/105* (2014.11);
(Continued)

(58) Field of Classification Search
CPC .... H04N 19/33; H04N 19/105; H04N 19/119; H04N 19/132; H04N 19/159;
(Continued)

(56) References Cited

U.S. PATENT DOCUMENTS

2010/0027678 A1   2/2010   Alfonso
2012/0294369 A1   11/2012  Bhagavathy et al.
(Continued)

FOREIGN PATENT DOCUMENTS

CN   103797792   5/2014
WO   2017/129568  8/2017

OTHER PUBLICATIONS

The International Search Report (ISR) with Written Opinion for PCT/EP2019/059569 dated Jul. 16, 2019, pp. 1-17.
(Continued)

*Primary Examiner* — Allen C Wong
(74) *Attorney, Agent, or Firm* — McDonnell Boehnen Hulbert & Berghoff LLP

(57) ABSTRACT

A method of encoding video data into a bitstream comprising: determining from the plurality of video blocks of a video frame of a first resolution a current block and one or more reference blocks including reference samples for predicting original samples of the current block; determining predicted samples of the current block based on a down-sampling scheme, the determining comprising computing samples of a first low-resolution block of a second resolution that is lower than the first resolution, and predicting samples of one or more second low-resolution blocks of the second
(Continued)

resolution based on the samples of the first low resolution block, the samples of the first low-resolution block and the one or more second low-resolution blocks defining predicted samples of the current Block; and, determining residual samples of a residual block based on original samples of the current block and the predicted samples of the current block; transforming the samples of the residual block into a bitstream; and, embedding metadata associated with the current block in the bitstream for signalling a decoder apparatus that the predicted samples of the current block are based on the downsampling scheme.

17 Claims, 14 Drawing Sheets

(51) Int. Cl.
| | |
|---|---|
| H04N 19/159 | (2014.01) |
| H04N 19/176 | (2014.01) |
| H04N 19/177 | (2014.01) |
| H04N 19/184 | (2014.01) |
| H04N 19/46 | (2014.01) |
| H04N 19/105 | (2014.01) |
| H04N 19/132 | (2014.01) |
| H04N 19/30 | (2014.01) |
| G06T 3/40 | (2006.01) |
| G06T 9/00 | (2006.01) |

(52) U.S. Cl.
CPC ......... *H04N 19/119* (2014.11); *H04N 19/132* (2014.11); *H04N 19/159* (2014.11); *H04N 19/176* (2014.11); *H04N 19/177* (2014.11); *H04N 19/184* (2014.11); *H04N 19/30* (2014.11); *H04N 19/46* (2014.11)

(58) Field of Classification Search
CPC .. H04N 19/176; H04N 19/177; H04N 19/184; H04N 19/30; H04N 19/46; G06T 3/4046; G06T 9/002
USPC ...................................................... 375/240.02
See application file for complete search history.

(56) References Cited

U.S. PATENT DOCUMENTS

| | | | |
|---|---|---|---|
| 2015/0103886 A1 | 4/2015 | He et al. | |
| 2015/0161772 A1* | 6/2015 | Greiner ................ | G06T 3/0056 382/232 |
| 2016/0127728 A1 | 5/2016 | Tanizawa et al. | |
| 2017/0251222 A1 | 8/2017 | Ye et al. | |
| 2018/0007367 A1 | 1/2018 | Zeng et al. | |
| 2019/0253704 A1* | 8/2019 | Mao ..................... | H04N 19/134 |

OTHER PUBLICATIONS

Tan, Yih Han et al. "Intra Coding With Adaptive Partial Reconstruction" IEEE Transactions on Circuits and Systems for Video Technology (2013) vol. 23(2), pp. 273-279.

Tan Yih Han et al "Intra-prediction with adaptive sub-sampling" Joint Collaborative Team On Video Coding (JCT-VC) of ITU-T SG16WP3 and ISO/IEC JTC1/SC29/WG11, 2nd Meeting: Geneva, CH Jul. 21-28, 2010.

Partial European Search Report for EP Application No. 18 167 361.7 dated Oct. 15, 2018, pp. 1-10.

Vitali, Andrea et al. "Low-Complexity Standard-Compatible Robust and Scalable Video Streaming over LossyNariable Bandwidth Networks" 2005 Digest of Technical Papers International Conference on Consumer Electronics (IEEE Cat. N0.05CH37619) IEEE Piscataway (2005), pp. 7-8.

"ITU-T H. 261 Line Transmission of Non-Telephone Signals Video Codec For Audiovisual services at p x 64 Kbits" Mar. 1, 1993 (Mar. 1, 1993). pp. i.1-i.25. XP055224103. Retrieved from the Internet: URL:https://webcache.googleusercontent.com/search?q=cache:me39L ENMcJ:https://www.itu.int/rec/dologin_pub~asp%3Flang%3De%26id%3DT-REC-H.261-199303-I!!PDF-E%26type%3Ditems+&cd=1&hl=en&ct=clnk&gl=nl&client-firefox-b-ab [retrieved on Oct. 28, 2015].

Aggelos K. Katsaggelos, Rafael Molina and Javier Mateos, Super Resolution of Images and Video, Synthesis Lectures on Image, Video and Multimedia Processing #7, 2007 by Morgan & Claypool.

Sullivan, Gary J., et al. "Overview of the high efficiency video coding (HEVC) standard." IEEE Transactions on circuits and systems for video technology 22.12 (2012): 1649-1668 (Year: 2012).

Xu, Xiaozhong, et al. "Intra block copy in HEVC screen content coding extensions." IEEE Journal on Emerging and Selected Topics in Circuits and Systems 6.4 (2016): 409-419 (Year: 2016).

The International Search Report (ISR) with Written Opinion for PCT/EP2019/059534 dated Jul. 11, 2019, pp. 1-17.

Japanese Office Action in Japanese Patent Application No. 2018-538752, dated Oct. 7, 2019.

Venugopal, Gayathri et al. "Fast Template Matching for Intra Prediction" IEEE International Conference On mage Processing (ICIP), IEEE (2017), pp. 1692-1696.

PCT International Search Report and Written Opinion, PCT International Application No. PCT/EP2017/051438, dated Apr. 7, 2017, 13 pages.

Xin Li et al. "Multiple Description Image Coding For Scalable and Robust Transmission over IP," Proceedings of the 6th World Congress on Intelligent Control and Automation, Jun. 21-23, 2006, Dalian, China, USA, IEEE, Oct. 23, 2006, pp. 9996-10000 (Year: 2006).

Park, Sung Cheol et al., "Super-Resolution Image Reconstruction: A Technical Overview", IEEE Signal Processing Magazine, May 2003, pp. 21-36.

Sung Cheol Park, Min Kyu Park, and Moon Gi Kang, "Super-Resolution Image Reconstruction: A Technical Overview," IEEE Signal Processing Magazine, May 2003.

Marco Folli, Lorenzo Favalli, and Matteo Lanati, Parameters optimization for a scalable multiple description coding scheme based on spatial subsampling, Mobimedia 2008, Oulu, Finland.

Heiko Schwarz, Detlev Marpe, and Thomas Wiegand, "MCTF and Scalability Extension of H.264/AVC," Proc. Picture Coding Symposium, Jan. 2004.

Text of ISO/IEC FDIS 23008-2:201X (2nd edition update), Draft ISO/IEC 23008-2:201x(E), ISO/IEC JTC1/SC29/WG11 N14700, Jul. 2014, Sapporo, Japan.

European Office Action in Application No. 17 700 870.3-1208, dated Apr. 2, 2020.

European Search Report, European Patent Application No. 16152562.1, dated Mar. 21, 2016, 4 pages.

Minoo, Koohyar et al., "Spatial Scalability for HEVC", Joint Collaborative Team on Video Coding (JCT-VC) of ITU-T SG 6 WP3 and ISO/IEC JTC1/SC29/WG11, 5th Meeting, Genneva, Switzerland, Mar. 16-23, 2011, pp. 1-14.

Vandeventer, Oskar M_ et al., "Proposed White Paper on MPEG DASH part 1 AMO 2", International Organisation for Standardisation, ISO/IEC JTC1/SC29/WG11, MPEG 2015, Geneva Switzerland, Oct. 19, 2015, 3 pages.

Office Action in Chinese application CN201980023251.2, dated Dec. 7, 2021.

* cited by examiner

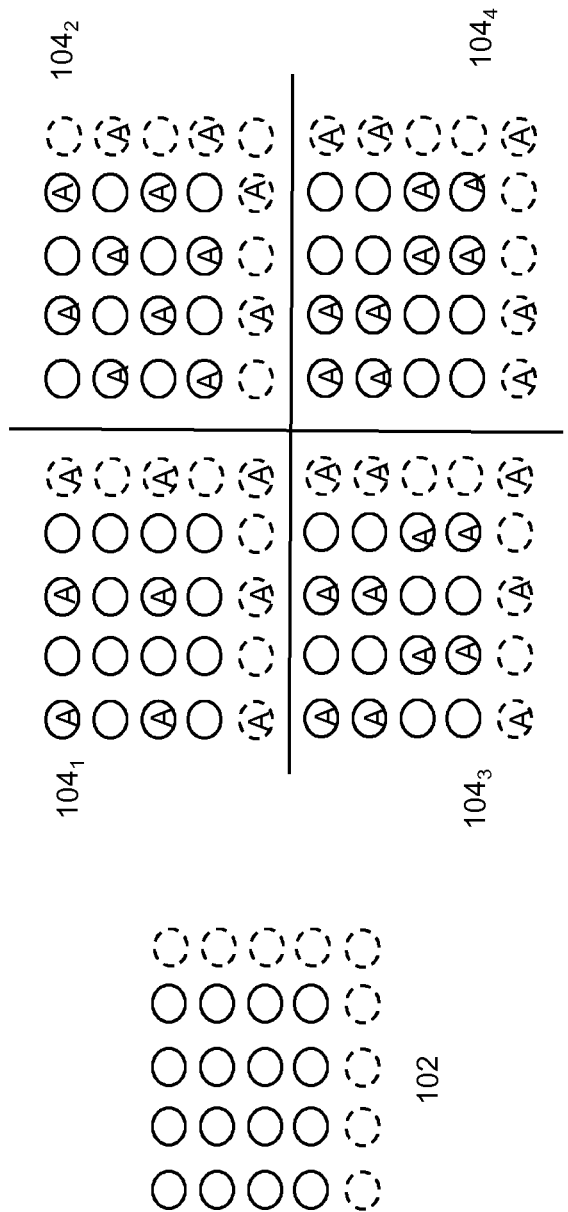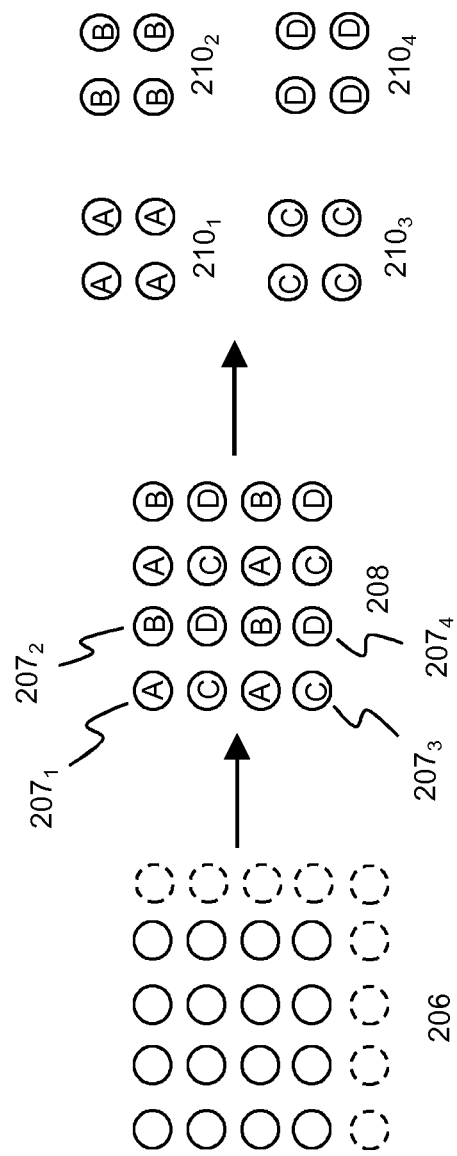
FIG. 1
FIG. 2

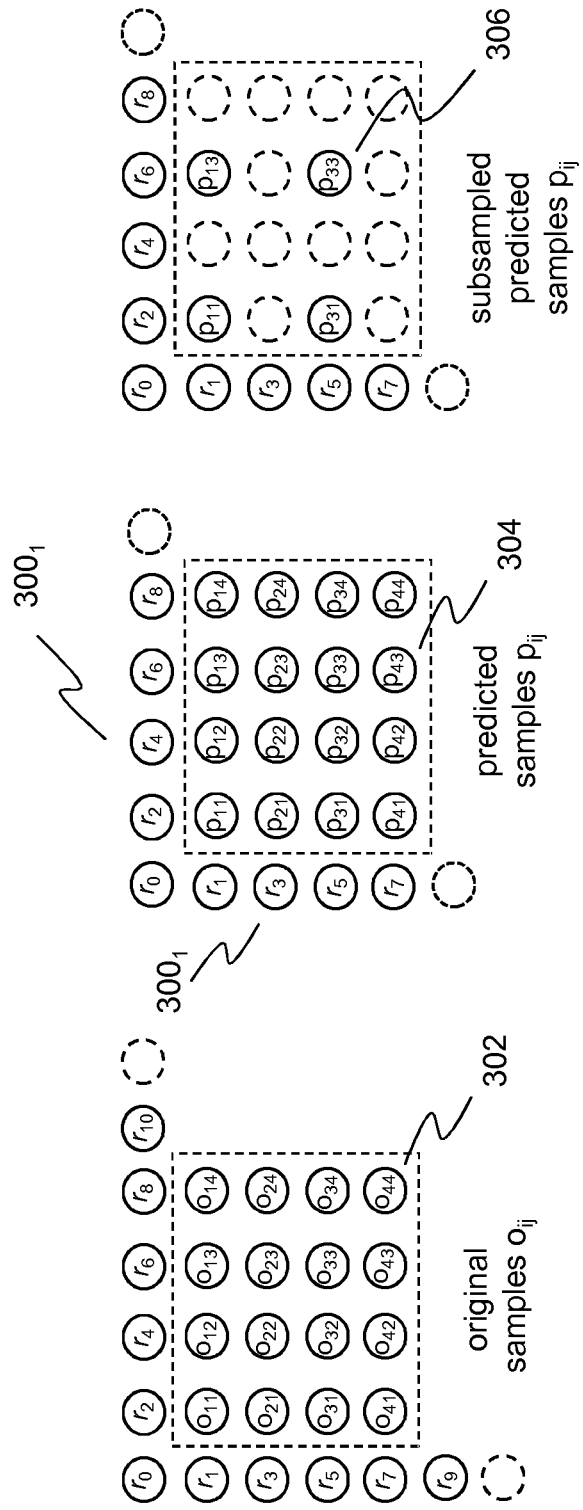
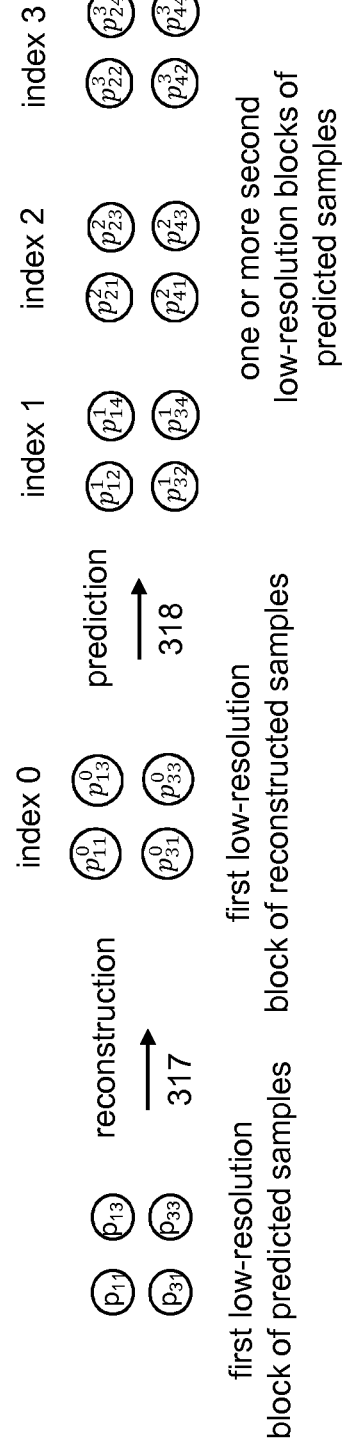
FIG. 3A
FIG. 3B
FIG. 3C
FIG. 3D

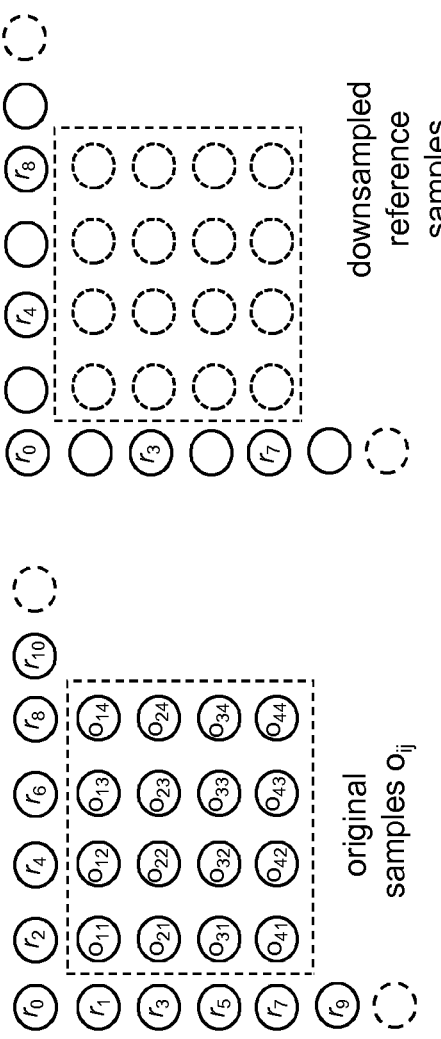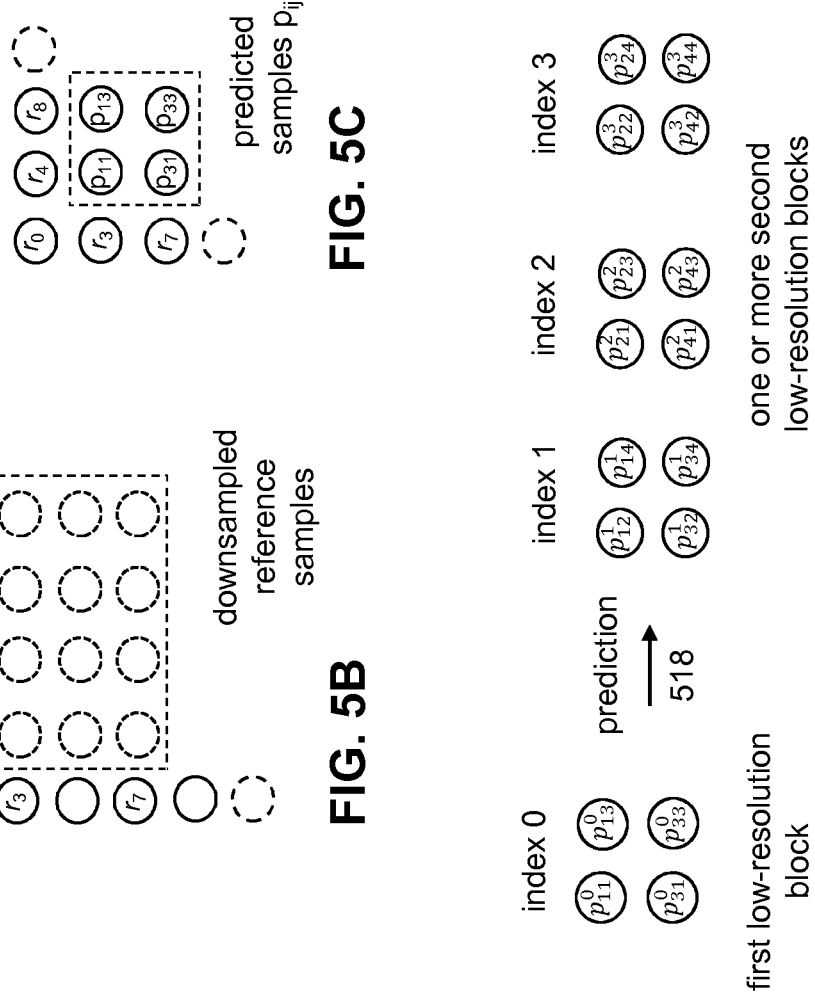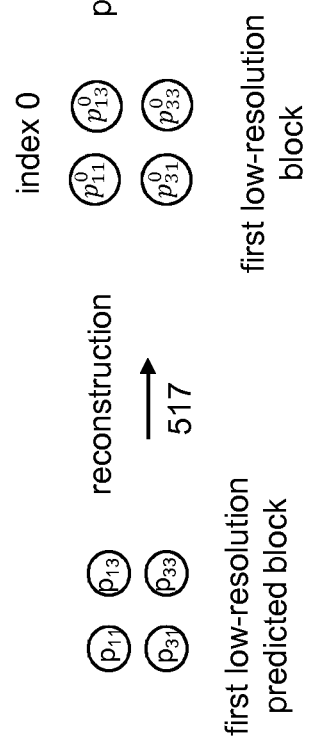
FIG. 5A
FIG. 5B
FIG. 5C
FIG. 5D

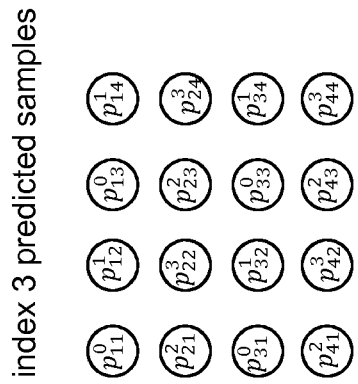
FIG. 7C
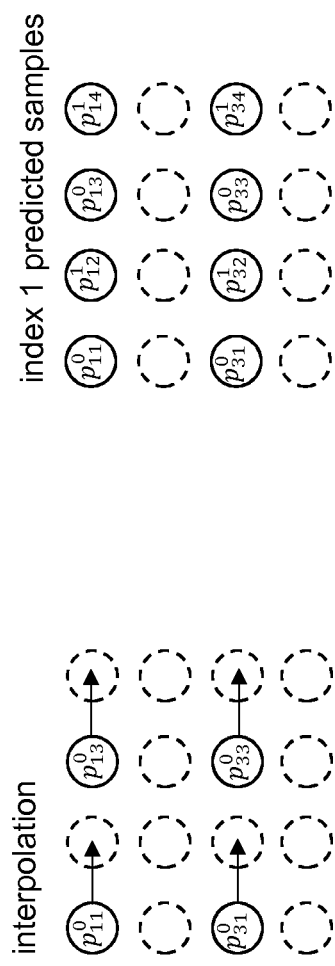
FIG. 7B
FIG. 7A
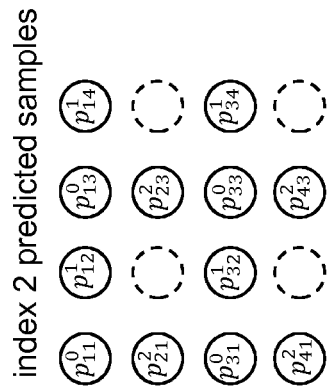
FIG. 7F
FIG. 7E
FIG. 7D

BLOCK-LEVEL SUPER-RESOLUTION BASED VIDEO CODING

CROSS REFERENCE TO RELATED APPLICATIONS

The present application is a national stage entry of, and claims priority to, PCT/EP2019/059569, filed on Apr. 12, 2019, which claims priority to European Patent Application EP 18167361.7, filed in the European Patent Office on Apr. 13, 2018, both of which are hereby incorporated in their entirety herein by reference.

FIELD OF THE INVENTION

The invention relates to block-level super-resolution based video coding, and, in particular, though not exclusively, to methods and systems for super-resolution based video coding, an encoder apparatus and a decoder apparatus comprising a module for super-resolution based video coding and a computer program product for executing such methods.

BACKGROUND OF THE INVENTION

In video coding standardisation, the joint MPEG/ITU groups have traditionally adopted a hybrid video coding system (e.g. AVC and HEVC). The hybrid system comprises a combination of motion-prediction and video block-based transform coding. Here, a video block (or in short a block) refers to a basic processing unit of a video standard. Video blocks are named differently in different coding standards, for example in H.264/AVC a block is referred to as a macroblock, in HEVC a block is referred to as a Coding Tree Unit (CTU) and in VP9 and AV1 a coding block is referred to a super block. The hybrid video coding system aims at exploiting the redundancy of video samples in video frames. In particular, motion-prediction exploits temporal redundancy between consecutive frames and spatial correlation of pixels within a given frame, while a so-called transform coding decorrelates the signal components. Current state of the art coding standards such as HEVC, AV1 and the currently developed VVC (Versatile Video Coding) have substantially higher compression efficiencies when compared to other coding standards of previous generations such as H.264/AVC (MPEG-4 part 10).

Temporal prediction cannot be used in certain situations, e.g. in case of a first frame of a video sequence, in case a frame is a key frame (i.e. a frame from which decoding can be started in the middle of the compressed bitstream) or in case the correlation between two frames is too small (e.g. abrupt scene changes). In these cases, an intra-prediction scheme may be used in order try to compress the video. Intra-prediction is based on previously coded blocks in the current frame and presupposed strong correlations between neighbouring pixels, i.e. "spatial redundancy" between pixels. This spatial redundancy may be present in both the luma and the chroma information of a video frame. For example, in soccer game images, adjacent pixels of a green pixel will mainly also be green. Also, generally, pixels adjacent to a dark pixel will also be dark, for example in shadow areas.

Typically, blocks in a video frame as processed in raster scan order starting, i.e. row by row, starting from the block in the left upper corner of the video frame. Thus, as predicting pixels of the current block will be based on previously coded samples of neighbouring blocks, typically blocks that are positioned above and/or at the left side of the current block. HEVC and AV1 have different types of intra prediction methods available for a macroblock, each type having its own modes. For example, for luma information there are different types of intra prediction: a prediction method for a 16×16 block (the entire macroblock), for a 8×8 block (four per macroblock) or for a 4×4 block (sixteen per macroblock). For the chroma information there is method wherein the prediction is performed based on one block for that macroblock.

Moreover, dependent on the type of prediction method there are different modes available: different modes for 8×8 or 4×4 luma prediction, and different modes for 16×16 luma prediction and for chroma information. Each mode determines precisely how the values of the pixels in the current block are predicted based on earlier encoded pixel values in the neighbourhood of the current block that needs to be encoded. Due to the order in which the (macro)blocks are encoded, only the pixels of the block that is situated to the left or above the current block are available. When the encoder decides to predict a current block based on intra-prediction, it will select a type of intra-prediction and one of the modes that belongs to the intra-prediction type. The encoder will use the predicted block to determine a residual block, which is sent by the encoder together with information about the intra-prediction type and the associated mode to the decoder.

It is up to the encoder to select which type of intra prediction and which mode to use.

While the use of smaller block sizes in the prediction process probably will result in a more accurate prediction, there is also a larger overhead because the encoder needs to signal the chosen mode for a larger number of blocks in the bitstream. Typically, for more homogenous areas, the prediction will usually be performed based on the larger block (such as 16×16, 64×64 or even larger), and for the more detailed areas the prediction will usually be based on smaller blocks.

In certain situations, however, the presumption of strong correlations of the video signal between neighbouring pixels no longer holds. This may for example be the case for 360 video wherein such spatial correlations no longer present or at least substantially reduced due to effects of projection on a 2D surface (EPR or cubic) such as geometry seams. Hence, in that case (video blocks of) I frames cannot be accurately predicted and thus efficiently compressed. This may seriously deteriorate the overall compression efficiency of the video signal as I frames may represent a significant part of the total data in a bitstream, sometimes even up to 80%.

Also in conventional 2D video coding, video signals can have naturally low correlation, e.g. natural scenes with large texture (grass, sand, vegetation, etc.), noise in video, every phenomenon that decreases to the correlation between two neighbouring pixels. More generally, for a certain correlation of the video signal in a region of a video frame that needs to be compressed, intra-prediction will provide efficient compression up to a certain size of the predicted video block of the video signal in that region, since the correlation decreases as the distance between two pixels increases Hence, from the above it follows that there is a need in the art for improved coding schemes that enable efficient video coding, in particular efficient video block coding for high-resolution video, especially 4K video or higher.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The invention enables efficient coding of video blocks of an original video frame. In particular, the invention provides an in-loop coding of video blocks in which downsampling, e.g. a polyphase downsampling scheme, is used in the process of determining a prediction block, i.e. predicted samples of a current block (a video block that needs to be encoded). The downsampling scheme may spatially downsample an original (current) block in a first low-resolution original block and one or more second low-resolution original blocks, wherein the resolution of the first and second low resolution original blocks is lower than the resolution of the blocks of the original video frame. The use of the downsampling scheme in the encoding of the video frame may provide substantial benefits in terms of coding efficiently in case the video frame comprises pixel values (samples) that exhibit a low spatial correlation.

In an aspect, the invention may relate to a method of encoding a video frame into a bitstream, the method comprising: a processor of an encoder apparatus determining a set of original samples of a current block that needs to be encoded and determining reference samples of one or more reconstructed blocks, each of the one or more reconstructed blocks being encoded and subsequently decoded, the current block and the reconstructed blocks being part of the video frame, the video frame having a first resolution;

the processor determining a subset of original samples based on the set of original samples and a downsampling scheme, preferably based on a spatial sampling lattice of the downsampling scheme; the processor determining first predicted samples based on the reference samples, the first predicted samples forming a first low-resolution prediction block having a second resolution that is lower than the first resolution, the first predicted samples defining predictions for the subset of original samples; the processor determining second predicted samples of one or more second low-resolution prediction blocks based on the first predicted samples, each of the one or more second low-resolution prediction blocks being of the second resolution; the processor determining residual samples of a residual block based on the set of original samples and the first and second predicted samples; and, the processor transforming the residual samples into the bitstream, the bitstream including metadata for signalling a decoder apparatus that the first and second predicted samples are determined based on the downsampling scheme.

Hence, the invention relates to an encoding method of a video frame from a sequence of video frames. During the encoding process of the video frame, the video frame is partitioned in blocks, wherein each block includes a predetermined number of video samples. A block that needs to be encoded is typically referred to as the current or original block, which include original samples. The encoding process aims to provide accurate predictions for the original samples of the current block. To that end, a subset of original samples is selected based on a downsampling scheme, wherein the subset of original samples may form a (subsampled) low-resolution block of the current block.

The downsampling scheme, e.g. a polyphase downsampling scheme, may include a plurality of different spatial sampling lattices. Video blocks determined on the basis of such low-resolution sampling lattice may represent low-resolution video block (a resolution component). Different low-resolution blocks (resolution components) may be formed by subsampling a high-resolution video frame based on different sampling lattices. A group of sampling lattices may be selected such that the resolution components generated based on this group of sampling lattices can be used to reconstruct the original video block, i.e. reconstruct a video signal that is identical or almost identical to original high-resolution video signal.

The selection of the subset of original samples may be based on one of the plurality of spatial sampling lattices. Initial predictions for the subset of original samples may be determined based on reconstructed samples of already encoded blocks (reference blocks). The accuracy of the initial predictions may be further improved by determining reconstructed samples on the basis of the initial predictions and the original samples. These reconstructed samples may be used as first predicted samples of a first low-resolution prediction block that has a second resolution that is lower than the first resolution, and may be used as reference samples for determining second predicted samples of one or more second low-resolution prediction blocks. Wherein the one or more second low-resolution predictions blocks are associated with one or more different spatial downsampling lattices of the downsampling scheme. The downsampling lattices of the downsampling scheme can be used to upsample the predicted samples of the first low-resolution prediction block and the one or more second low-resolution blocks and to combine the upsampled predicted samples into predicted samples of a prediction block of the current block. The construction of a high-resolution signal (a prediction block of the current block) based on a plurality of low-resolution signals (first predicted samples of a first low resolution prediction block and second predicted samples of one or more second low-resolution prediction blocks) may be referred to as a super resolution technique. Hence, the prediction modes described in this application may be referred to as super resolution prediction modes, in particular inloop super resolution prediction modes as the processing is carried out within the encoder loop and the decoder loop.

In an embodiment, the method may further comprise a transmitter transmitting the bitstream to a decoder device and/or storing the bitstream into a memory.

In an embodiment, determining first predicted samples based on the reference samples may include: determining candidate predicted samples for the subset of original samples based on a functional relation between one or more of the reference samples; determining residual samples of a first low-resolution residual block based on the original samples of the current block and the candidate predicted samples; and, determining reconstructed samples of the first low-resolution block based on the residual samples of the low-resolution residual block and the candidate predicted samples, the reconstructed samples defining the first predicted samples. Hence, candidate predicted samples may be determined based on reference samples that are located outside the current block, e.g. reference samples that are located in one or more blocks that are close (e.g. bordering) the current block. Then, reconstructed samples may be determined based on the candidate predicted samples by using the decoder loop of the encoder apparatus in which a reconstructed low-resolution residual block is combined with the candiated predicted samples into reconstructed samples of the first low-resolution block.

In an embodiment, the functional relation between one or more of the reference samples may be determined based on an intra-prediction mode of a video coding standard or a prediction algorithm, for example a machine learning algorithm or an algorithm based on a trained neural network.

In an embodiment, determining second predicted samples of one or more second low-resolution prediction blocks based on the first predicted samples may include: determining a predicted sample of one of the one of more second low-resolution blocks based on interpolation of at least part of the first predicted samples.

Alternatively, second predicted samples of the one or more second low-resolution blocks may be determined based on an algorithm, a machine learning algorithm or algorithm or an algorithm based on a trained (deep) neural network.

Activation of the super resolution mode may be signalled explicitly or implicitly in the bitstream. In an embodiment, the metadata may include first information, preferably one or more first parameters, for example a (binary) flag, for signalling a decoder apparatus that the predicted samples of the current block are determined based on a downsampling scheme.

| super resolution mode | downsampling scheme applied to | signaling |
|---|---|---|
| 1 | exactly one video block | a flag in the video block header |
| 2 | a subset of all video blocks of a video frame, e.g. a slice, a tile group | a flag in the slice header or tile group header |

In an embodiment, the metadata may include second information, preferably one or more second parameters, for signalling a decoder apparatus how the predicted samples of the current block are determined based on the reference samples. For example, the metadata may signal that a (conventional) intra-prediction method is used to determine the first predicted samples.

In an embodiment, the metadata includes third information, preferably one or more third parameters, for signalling a decoder apparatus how predicted samples of one or more second low-resolution prediction blocks of the second resolution are determined based on the predicted samples of the first low resolution prediction block.

Hence, the super-resolution prediction mode may use a downsampling scheme for downsampling and upsampling at block level, e.g. a single video block or a subset of all video blocks of a video frame (i.e. super resolution modes 1 and 2 of table 1), wherein a first parameter, e.g. a binary flag, may be used to signal whether a downsampling scheme is used. A second parameter may be used for signalling the type of downsampling scheme that is used (e.g. polyphase downsampling). The second parameter may only be present if a downsampling scheme is used. It is noted many other alternatives can be used, for instance only one flag, longer or shorter bit depth, etc. In addition, and/or alternatively, the signalling can also be inserted in a SEI message.

In case the super resolution mode is applied to exactly one video block, the metadata for signalling can be inserted in the payload of video block. Table 2 is an example of a modified coding unit payload in HEVC which contains this signalling:

TABLE 2

|  | Descriptor |
|---|---|
| coding_unit( x0, y0, log2CbSize ) { | |
| ... | |
| super_resolution_flag | u(1) |
| if(super_resolution_flag) { | |
| super_resolution_type | u(3) |
| } | |
| ... | |
| } | |

In an embodiment, the video frame may be an intra-prediction, I, frame, a inter-predicted, P, frame, a bidirectional precited, B, frame or a super frame.

In an embodiment, the video frame may be a projected video frame comprising spherical video data projected onto a rectangular 2D surface of a video frame using a projection model. In an embodiment, the projection model may be an equirectangular projection model or a cube projection model.

In an aspect, the invention may relate to a method of decoding a bitstream into of a video block of a video frame, wherein the method may comprise: a processor of a decoder apparatus receiving a bitstream comprising encoded residual samples of a residual block, the residual samples being associated with a set of original samples of a current block, the current block being part of the video frame of a first resolution; and, the bitstream comprising metadata associated with the encoded residual samples of a residual block for signalling the decoder apparatus that the residual block was encoded based on a downsampling scheme; the processor determining first predicted samples of a first low-resolution prediction block based on the downsampling scheme, preferably based on a spatial sampling lattice of the downsampling scheme, and reference samples of one or more reconstructed blocks, each of the one or more reconstructed blocks being encoded and subsequently decoded, the first low-resolution prediction block having a second resolution that is lower than the first resolution; the processor determining second predicted samples of one or more second low-resolution prediction blocks based on the first predicted samples, each of the one or more second low-resolution prediction blocks being of the second resolution; the processor determining predicted samples of the current block based on the first predicted samples of the first low-resolution block and the second predicted samples of the one or more second low-resolution blocks; and, the processor determining reconstructed samples of the current block based on the predicted samples of the current block and the residual samples.

In an embodiment, determining first predicted samples based on the reference samples may include: determining candidate predicted samples for the subset of original samples based on a functional relation between one or more of the reference samples; determining residual samples of a first low-resolution residual block based on the original samples of the current block and the candidate predicted samples; determining reconstructed samples of the first low-resolution block based on the residual samples of the low-resolution residual block and the candidate predicted samples, the reconstructed samples defining the first predicted samples.

In an embodiment, the functional relation between one or more of the reference samples may be determined based on an intra-prediction mode of a video coding standard or a prediction algorithm, for example a machine learning algorithm or an algorithm based on a trained neural network.

In an embodiment, determining second predicted samples of one or more second low-resolution prediction blocks based on the first predicted samples may include:
determining a predicted sample of one of the one of more second low-resolution blocks based on interpolation of at least part of the first predicted samples.

In an embodiment, the metadata may include one or more first parameters, for example a (binary) flag, for signalling a decoder apparatus that predicted samples of the current block are determined based on a predetermined downsampling scheme; and/or, wherein the metadata includes one or more second parameters for signalling a decoder apparatus how predicted samples of the current block are determined based on the reference samples; and/or, wherein the metadata includes one or more third parameters for signalling a decoder apparatus how the predicted samples of one or more second low-resolution blocks are determined based on the predicted samples of the first low resolution block.

In an embodiment, the bitstream may be a High Efficiency Video Coding, HEVC, based bitstream, Alliance for Open Media Video, AV, based bitstream, or a Versatile Video Coding, VVC, bitstream.

In a further aspect, the invention may relate to an apparatus for encoding video data into a bitstream, wherein the apparatus may comprise: a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations comprising: determining a set of original samples of a current block that needs to be encoded and determining reference samples of one or more reconstructed blocks, each of the one or more reconstructed blocks being encoded and subsequently decoded, the current block and the reconstructed blocks being part of the video frame, the video frame having a first resolution; determining a subset of original samples based on the set of original samples and a downsampling scheme, preferably based on a spatial sampling lattice of the downsampling scheme; determining first predicted samples based on the reference samples, the first predicted samples forming a first low-resolution prediction block having a second resolution that is lower than the first resolution, the first predicted samples defining predictions for the subset of original samples;
determining second predicted samples of one or more second low-resolution prediction blocks based on the first predicted samples, each of the one or more second low-resolution prediction blocks being of the second resolution; determining residual samples of a residual block based on the set of original samples and the first and second predicted samples; and,
transforming the residual samples into the bitstream, the bitstream including metadata for signalling a decoder apparatus that the first and second predicted samples are determined based on the downsampling scheme.

In yet a further aspect, the invention may relate to an apparatus for decoding a bitstream into a block of a video frame, wherein the apparatus may comprise: a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations comprising: receiving a bitstream comprising encoded residual samples of a residual block, the residual samples being associated with a set of original samples of a current block, the current block being part of the video frame of a first resolution; and, the bitstream comprising metadata associated with the encoded residual samples of a residual block for signalling the decoder apparatus that the residual block was encoded based on a downsampling scheme; determining first predicted samples of a first low-resolution prediction block based on the downsampling scheme, preferably based on a spatial sampling lattice of the downsampling scheme, and reference samples of one or more reconstructed blocks, each of the one or more reconstructed blocks being encoded and subsequently decoded, the first low-resolution prediction block having a second resolution that is lower than the first resolution; determining second predicted samples of one or more second low-resolution prediction blocks based on the first predicted samples, each of the one or more second low-resolution prediction blocks being of the second resolution; determining predicted samples of the current block based on the first predicted samples of the first low-resolution block and the second predicted samples of the one or more second low-resolution blocks; and, determining reconstructed samples of the current block based on the predicted samples of the current block and the residual samples.

In an aspect, the invention relates to an encoder apparatus configured to execute the method of encoding video data into a bitstream as described with reference to the embodiments described in this application.

In an aspect, the invention relates to a decoder apparatus configured to execute the method of decode a bitstream into video data as described with reference to the embodiments described in this application.

The invention may further relate to a computer program product comprising software code portions configured for, when run in the memory of a computer, executing the method steps according to any of method steps described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 1 examples of spatial subsampling schemes that may be used in the embodiments described in this disclosure.

FIG. 2 an example of a polyphase subsampling scheme that may be used in the embodiments described in this disclosure.

FIG. 3A-3G illustrates encoding scheme according to an embodiment of the invention.

FIG. 5A-5D illustrates encoding scheme according to another embodiment of the invention.

FIG. 7A-7F illustrates a prediction method according to an embodiment of the invention.

DETAILED DESCRIPTION

Figure 3E:
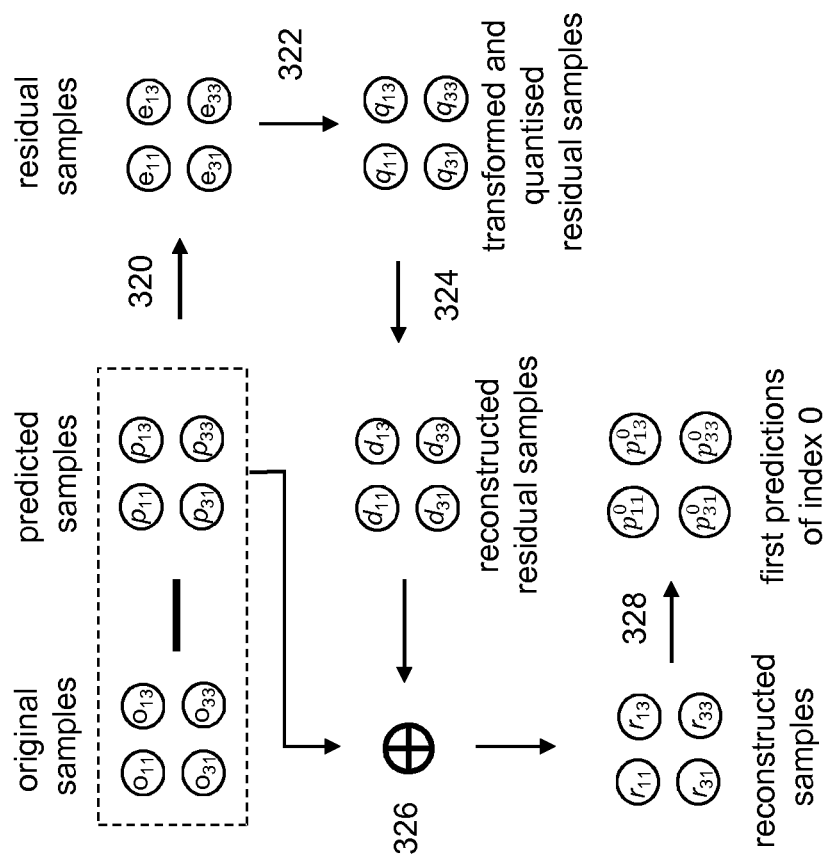

It is an aim of the embodiments in this application to use a super resolution technique to compress and encode blocks of a video frame in a video coding process. The super resolution technique may be used during an in-loop coding process such that the encoder can encode downsampled video blocks (low-resolution blocks) of the original video frames. Hence, during the inloop coding process, the encoder may encode video blocks of a lower resolution than the video blocks in an original video frame. The decision by the encoder whether to use the super resolution technique to compress video blocks in a video frame may be evaluated based on a cost function in a rate distortion optimisation (RDO) loop of the encoder. This way, efficient coding of high-resolution video frames, in particular high-resolution intra-coded (I) video frames, and video frames comprising video samples representing certain scenes that are hard to compress using conventional compression. Such video includes for example 360 video. The activation of the super resolution technique may be signalled in the bitstream so that the decoder can properly decode the bitstream and reconstruct the original video frames based on the decoded low-resolution video blocks.

In this disclosure, super-resolution processes may generally refer to image processing schemes for obtaining a high resolution (HR) image or a sequence of HR images based on a set of low resolution (LR) observations, e.g. images. These images may be coherent in time or not. For example, in a sequence of video frames, previous and subsequent video frames of a first resolution (e.g. standard definition or high resolution) may be used to reconstruct an image of a video frame of a second resolution (e.g. super resolution or 4K) in a video sequence. Super resolution processes primarily have been used to get spatial and temporal resolution enhancement when LR observations are generated with very little prior knowledge about their generation. For example, the spatial displacement between two LR observations may not be not known and need to be estimated. However, a super resolution process may also be used in a controlled and accurately defined environment. For example, during encoding, video frames can be downsampled using a predetermined downsampling scheme, e.g. polyphase downsampling, and super-resolution techniques may be used to construct a high-resolution image using upsampling the low-resolution frames and combining the upsampled low resolution frames into a high-resolution video frame. In that case, the super-resolution process can work optimal since the characteristics of the LR observations and their spatial and temporal relationships are known and do not need to be estimated.

FIGS. 1 and 2 depict examples of spatial subsampling schemes that may be used in the embodiments described in this disclosure. FIG. 1 depicts part of a video frame 102, e.g. a video block, that may be formed by sampling a part of a continuous image based on a (regular) sampling lattice, e.g. a high-resolution lattice or array of video samples. Here, each sampling point in the sampling lattice may form a video sample in the high-resolution video frame. Video samples may represent a particular colour component in an RGB or an YCbCr color scheme. For example, three RGB video samples may form one colour pixel in a video frame. Different types of low-resolution video frames may be formed based on the high-resolution frames of a high-resolution video signal by using different low-resolution sampling lattices $104_{1-4}$. Generally, a low-resolution sampling lattice has a lower sampling density than the sampling lattice of the high-resolution video frames. In downsampling operations known from e.g. scalable video coding standards such as Scalable Video Coding of AVC (SVC) and Scalable HEVC (SHVC), new pixel values of the video frames of the downsampled video signal be calculated based on sets of pixel values in the video frames of the original high-resolution video signal.

Certain downsampling schemes however do not change the pixels values. Such schemes may hereafter be referred to as spatial subsampling schemes. Such spatial subsampling schemes only select a subset of pixel values from a set of pixels values forming an image frame. A spatial subsampling scheme allows very efficient reconstruction of the original video signal or a low-resolution version thereof. Additionally, the spatially subsampled video frames of the resolution components allow the use of super resolution techniques for constructing a high-resolution video frame. It is noted that the sampling lattices shown in FIG. 1 should be considered as examples of a large number of different sampling lattices that may be used in the embodiments of this disclosure.

Video frames produced by such low-resolution sampling lattice may represent video frames of a resolution component. Different resolution components may be formed by subsampling high-resolution video frames based on different sampling lattices. A group of sampling lattices may be selected such that the resolution components generated based on this group of sampling lattices can be used to reconstruct the original high-resolution video signal, i.e. reconstruct a video signal that is identical or almost identical to original high-resolution video signal. Further, one or more spatial sampling lattices may be selected such that of the resolution components generated based on the one or more sampling lattices may be used to construct a low-resolution version of the high-resolution video signal.

In some embodiments, the sampling lattices used for subsampling a high-resolution video frame may have the same sampling density. Resolution components generated on such sampling lattices have the same resolution. In other embodiments (some of) the sampling lattices may have different sampling densities. In that case, (some of) the resolution components have different resolutions. Moreover, as shown in FIG. 1, in some embodiments, sampling lattices may have overlap, i.e. one or more sampling points in common. In other embodiment, there is no overlap between sampling lattices.

Hence, groups of resolution components may be generated based on spatial subsampling as depicted in FIG. 1. All the resolution components in the group may be used to reconstruct the original high-resolution video signal and some of the resolution components in the group may be used to construct one or more low resolution versions of a high-resolution video signal.

FIG. 2 depicts an example of a spatial subsampling scheme. In particular, the figure depicts a polyphase subsampling scheme for generating a number of video frames (in the example four) of a first resolution based on pixels 202 of a video frame of a second resolution, wherein the second resolution is higher than the first resolution. In polyphase subsampling a 4×4 pixel matrix may be subsampled into four 2×2 low-resolution components $203_{1-4}$ wherein in the 4×4 pixel matrix each resolution component represents a spatially shifted 2×2 pixel matrix $206_{1-4}$. The polyphase subsampling scheme has four spatial subsampling lattices A,B,C,D for filtering particular samples our of a block of samples. The four resolution components may form a group of resolution components (a resolution component group) that can be used by the decoder to reconstruct the original (high resolution) video signal.

A high-resolution video may have a YUV-type colour format, e.g. a YUV 4:2:0 colour format, each frame having 1920×1088 pixel resolution and frame rate of 24 frames per second (fps). Subjecting this high-resolution video frame to a polyphase spatial subsampling process with a factor 2 (applied to Y, U and V) would result in four low-resolution video frames of the YUV 4:2:0 colour format, wherein each frame has a 960×544 pixel resolution and a frame rate of 24 fps.

The polyphase subsampling scheme as depicted in FIG. 2 provides the advantage that it allows very fast operation at both encoder and decoder side, where pixel values are not changed. However, it may introduce visual artefacts due to spatial aliasing effects, if the original signal contains frequencies greater than twice the subsampling frequency. In that case, any of the four low-resolution components may not be proper for rendering. To mitigate this effect, a post-filtering operation may be applied to enhance the output frames of the resolution components and cancel as much as possible these visual artefacts.

For example, in an embodiment, the polyphase subsampling may be performed after low-pass filtering of the high-resolution frames. This way visual artefacts due to aliasing effect may be eliminated. When low-pass filtering, a post-processing step is needed to restore the original image before rendering. Otherwise at best, the reconstructed signal is the low pass version of the input signal. In lossless coding, reverting the low-pass filter to restore the HR image is doable to some extant with techniques such as inverse Wiener filter. In lossy coding, the low-pass filtering may introduce some difficulties, especially in a low-bitrate encoding when the reconstructed signal is already severely damaged by the compression. Such a post-processing restoration scheme may only provide an estimate of the high frequencies that have been removed by the low-pass filter but does not truly restore the original signal. That is, they do not reverse the degradation pixel-wise.

Although the generation of spatial components are described with reference to polyphase subsampling other types of spatial subsampling schemes may be also used. Examples of such schemes include quincunx and hexagonal subsampling or derivatives thereof. Based on such spatial subsampling schemes resolution components may be formed and use to reconstruct a high-resolution video.

From a high-resolution frame x, with N pixels (matrix N×1), a set of K low resolutions frames $y^{(k)}$, each with M pixels (matrix M×1), M<N. For each k-th low resolution frame $y^{(k)}$, the filtering of the HR frame is described by the matrix H (dimension N×N) and the subsampling is defined by the matrix A (dimension M×N). Thus, the generative model may be represented as:

$$y^{(k)} = A^{(k)} H x$$

Here, it may be assumed that the same pre-filtering is applied to the HR frame as described above. In another embodiment, each k-th decomposition may have a matrix H. In yet another embodiment, one resolution component may have a matrix $H_{LP}$ that is a low-pass filter of the HR frame (hence avoiding visual artefact as Moiré effect) while the other resolution components have the same matrix $H_1$ which is the identity matrix, meaning that the HR frame is not filtered and a pure polyphase subsampling is performed.

Based on the above-described generative model, many reconstruction methods may be applied to produce x̂, the estimation of the HR frame x using known super-resolution techniques as e.g. described in the article by Sung Cheol Park et. al., "*Super-Resolution image reconstruction: a technical overview*", IEEE signal processing magazine, May 2003, pp. 21-36, which is hereby incorporated by reference. Examples of super-Resolution image reconstruction algorithms described in this article that may be used to reconstruct the HR video frames include, non-uniform interpolation, reconstruction in the frequency domain, regularized super-resolution reconstruction, projection onto convex sets reconstruction, ML-POCS hybrid reconstruction, iterative back-projection reconstruction, adaptive filtering reconstruction and motionless super-resolution reconstruction.

In an embodiment, an original high-resolution video frame may be decomposed into a plurality of low-resolution frames using a polyphase subsampling operation as described in FIGS. 1 and 2. In that case, the process to recombine the subsampled low-resolution video frames is simpler than in the more general case. The recombination process boils down to mapping each low-resolution video frame onto the recombined picture according to the position the low-resolution video frame had in the original high-resolution signal. This recombination process includes upsampling each of the low-resolution video frames with zero padding and combining the upsampled low resolution video frame by spatially shifting the matrix element to match the position of the upsampled low resolution video frames in the video frame of the original high-resolution video frame.

It is noted that the subsampling schemes described above with reference to FIGS. 1 and 2 may be applied to various video signals, including (but limited to) a whole video frame or a part thereof, e.g. one or more blocks of video samples, video blocks, which are used during video coding.

In this application, a number of different coding modes for coding video blocks based on a super resolution method are described. Here, video blocks are blocks of video samples that are processed by a functional element in a video encoder or decoder as one unit. In this application, the terms video block and block have the same meaning unless expressively stated otherwise.

The super resolution coding modes described in this application may be applied to a video block, a subset of all video blocks or all video blocks of a video frame. The signalling of these different types is summarized in the following table 1:

TABLE 1

| super resolution coding modes | | |
|---|---|---|
| mode | use of downsampling | signaling |
| 1 | exactly one video block | a flag in the video block header |
| 2 | a subset of all video blocks of a video frame, e.g. a slice | a flag in the slice header or tile group header |
| 3 | all the video blocks of a video frame | a flag in the frame header or slice header or tile group header |

The first and second super resolution coding modes of table 1 above refer to encoding and decoding one or a subset of a set of video blocks representing a video frame. The first and second modes define a coding scheme that includes downsampling a block of a video frame into low-resolution video blocks and encoding the downsampled low-resolution video blocks in a bitstream. Hence, the super resolution method may be used at block level and used in the scheme of an encoder as a super-resolution prediction unit (a super-resolution mode), next to an intra-prediction unit (intra-prediction mode) and an inter-prediction unit (inter-prediction mode).

If during encoding, the encoder decides to compress and encode a video block according to an intra-mode or according to a super resolution mode, the decoder needs to know when these modes should be activated. Activation of the super-resolution mode may be signalled as metadata in the bitstream and can take many forms. For example, in an embodiment, a flag associated with a video block, e.g. the video block header, may signal a decoder whether the super-resolution mode is activated for one video block. In another embodiment, in case of a subset of video blocks of the set of video blocks of a video frame, a flag in the slice header may be used. In a further embodiment, an (activation) flag may be assigned to or associated with a node of the binary tree coding the intra mode.

The third coding mode of table 1 above refer to encoding and decoding all video blocks of a video frame. In this case, during encoding the super resolution method is applied to all video blocks of a video frame.

In a traditional encoder, the frame type of a certain frame of the video depends on the position in a predetermined sequence of video frames, which is referred to as a group of picture (GOP) structure (e.g. IPBBP . . . ). The predetermined sequence of different frame types in a GOP can be overridden by the encoder, especially a professional-grade encoder, based on content analysis. For example, when a scene transition occurs, it is preferable to start with an I frame since a P or B frame would be more expensive to encode, as previous frames will differ substantially upon a scene change.

The conventional frame types include I, P and B type frames, wherein an I-frame is intra coded and wherein the P-type and B-type are inter code, respectively only backward and, backward and forward. Inside each video frame, each video block can further be defined into two types, intra-blocks and inter-blocks. An intra-block is coded using a spatial prediction scheme, wherein reference samples are located within the frame that comprises the current block), while inter-blocks are coded using a prediction scheme wherein reference samples are located in other frames, e.g. earlier or later frames. These frames are referred to as reference frames. The blocks of an I frame are all intra-coded. A block of a P or a B frame is either inter-coded or intra-coded. The latter case happens if no other region in references frame was found to efficiently predict the block. This may e.g. be the case, if in the video an object appears suddenly or in case of projected video frames of 360 video or more in general spherical video data.

The formation of 2D rectangular image frames or pictures on the basis of spherical video data may typically include a projection of the spherical video data onto the surfaces of a geometrical object (an object having straight edges) and mapping of the projected surfaces onto a rectangular shape. For encoding spherical video content, a 2D rectangular video frame is the most convenient form for use as input to an encoder apparatus, as it does not require modifications to existing video coding standards. Different projection models, such as an equirectangular projection (ERP), cube or pyramid projection model are known. In case of ERP, a sphere is projected onto a rectangle using the polar angles as the horizontal and vertical coordinates. In this case, the mapping is incorporated in the projection step as the EPR projection directly results into a rectangular shape. Both the equirectangular and other projection formats can be directly encoded using encoding schemes, such as H.264/AVC, HEVC, AV1 or VVC.

Application of a super-resolution mode to the whole video frame not only allows I frames to be subsampled using a super resolution method, but also P and B frames, if rate-distortion optimisation (RDO) shows that compression based on a super-resolution mode is advantageous. It may be expected that a super resolution mode that is based on one single video block or a subset of all video blocks of a video frame (modes 1 and 2 of table 1) is more efficient for activation in the compression of P and B frames since usually the presence of intra blocks in such frames is limited.

FIG. 3A-3G illustrates an encoding scheme according to an embodiment of the invention. In particular, the figures illustrate a prediction scheme for providing an accurate prediction for an original block of an original (current) video frame based on information of earlier encoded samples of the same video frame.

FIG. 3A illustrates the determination of original samples of a current block 302. As, during encoding, the blocks of the video frame may be encoded in raster scan order, the left and/or upper boundary of the current block will border samples of earlier encoded blocks. Original samples $o_{ij}$ of the current block may be derived from the size and the position of the block that needs to be encoded. Here, each sample in the block may have an index i,j indicating the position of the sample in the 2D array of samples that defines the block. A first prediction scheme may be used to determine predictions for the original samples of the current block. In such scheme, earlier encoded samples stored in a reference picture buffer of the encoder may be used as reference samples for predicting the original samples of the current block. Thus, predicted samples $p_{ij}$ of a current block may be determined based on a predetermined functional relationship between one or more reference samples $300_{1,2}$ as depicted in FIG. 3B.

The predicted samples may be predicted using any suitable (known or future) prediction technique. Different functional relationships ('modes') may be used to determine predicted samples, e.g. different intra-prediction modes. This way, the predicted samples may be determined based on the reference samples $r_i$ thus creating a coding dependency between the reference samples and the predicted samples. The thus determined predicted samples may form a first predicted block 304.

In certain situations however, the correlations of the video signal between neighbouring pixels is very weak so that the first predicted block does not represent an accurate prediction of the current block leading to a low compression efficiently.

In order to improve the accuracy of the predicted samples of the current block, the first predicted block may be downsampled based on a spatial downsampling scheme. This is illustrated in FIG. 3C. For example, a first subset of predicted samples $p_{11}, p_{13}, p_{31}, p_{33}$ may be determined using a spatial subsampling operation. For example, a first spatial downsampling lattice of a polyphase downsampling scheme as explained in detail with reference to FIG. 2 may be used to determine the four samples on predetermined locations in the block. The first subset of predicted samples may form a first low-resolution block of predicted samples. The predicted samples of the first low-resolution block are predictions for a subset of original samples in the current block wherein the subset of original samples may form a first low-resolution block of original samples. The thus predicted samples of the first low-resolution block may be regarded as candidate predicted samples, which are used to determine reference samples on the basis of a reconstruction step 317.

The reconstruction step 317 may be applied to the predicted samples of the first low-resolution block in order to determine a first low resolution block of reconstructed samples. As will be shown hereunder in more detail, these reconstructed samples may be used in a second prediction scheme 318 as reference samples for determining predictions for one or more second low-resolution blocks, in this case three low-resolution blocks that are associated with the second, third and fourth spatial subsampling lattice of the polyphase downsampling scheme as illustrated in FIG. 3D.

FIG. 3E illustrates the computation of the reconstructed samples referred to in FIG. 3D in more detail. As shown in this figure, reconstructed samples $r_{ij}$ of the first low-resolution block may be computed by feeding the predicted samples of the first low-resolution block to a reconstruction loop that is part of a hybrid block-based encoder model. The encoder and associated decoder is described hereunder in more detail with reference to FIGS. 10 and 11. FIG. 3E schematically depicts an inloop reconstruction process wherein a residual signal $e_{ij}$ may be computed between the predicted samples pij and the original samples $o_{ij}$ of the first low-resolution block (step 320). The residual samples may be transformed and quantized into a quantized transform coefficients of the residual samples (step 322). Thereafter, the quantized transform coefficients are reverse transformed and reverse quantized into reconstructed residual samples (step 324). The reconstructed residual samples may be added to the predicted samples of the first low resolution block to form a low-resolution block of reconstructed samples (step 326). This low-resolution block may be indexed by index 0 (step 328) indicating that the samples are used as reference samples for determining predicted samples for the other three spatial downsampling lattices of the polyphase downsampling scheme. These predicted samples may be organized in three low-resolution blocks identified by indexes 1,2,3 as illustrated in FIG. 3D. The computation of the residual samples, the transformation and quantitation operations, the inverse transformation and dequantization operations and reconstructed residual samples are operations of a hybrid encoder and thus may be executed by the corresponding functions as described hereunder with reference to FIGS. 10 and 11.

Various prediction schemes may be used for predicting samples of low resolution blocks with index 1,2,3, . . . based on the samples of low-resolution block of index 0 as depicted by step 318 of FIG. 3D. For example, in an embodiment, known techniques from inter-frame prediction may be used wherein a residual signal (e) may be obtained by subtraction of a predicted block ($\widehat{block}$) and a reference block (block) where the predicted block is derived from reconstructed samples from previous decoding steps. For example, in an embodiment, a simple identity function may be used as with k∈{1,3} so that the samples of the low-resolution block with index 1,2,3 are copies of the samples of resolution block with index 0:

$$\begin{cases} \widehat{index}_k(i,j) = index_0(i,j) \\ e_k(i,j) = \widehat{index}_k(i,j) - index_k(i,j) \end{cases}$$

In the super resolution mode the decoder is signaled that blocks are encoded based on a downsampling scheme that is known to the decoder. This way, samples of the indexed low-resolution blocks may be used to construct a predicted block of a resolution that is equal to the resolution of the (original) current block (step 520). This construction may involve upsampling the low-resolution blocks and combining the upsampled low-resolution blocks into a block as described with reference to FIGS. 1 and 2. The thus formed predicted block may be stored in a memory of the encoder as a reference frame for further coding. Further, the indexed low-resolution blocks and the associated original samples of the current block may be used to compute a residual signal ($e_k$) for k∈{1,3} (steps 622, 624, 626) which may be transformed, quantized and compressed using known functions of a hybrid encoder apparatus. In another embodiment, prediction samples of the indexed low-resolution blocks may determine based on interpolation between prediction samples of the different indices.

Exemplary prediction functions that can be used for determining samples of the indexed low-resolution blocks are described hereunder in more detail below with reference to FIG. 7A-7F. Indexed samples can be predicted by successive interpolations (any interpolation, linear, bilinear, cubic, etc.) of one or more reconstructed indices. Computation of the residual as the difference between predicted samples and original samples, quantisation, dequantization and reconstruction of the samples may be performed. In case, the prediction mode is selected by the encoder as the mode to be used, then the quantised residuals are compressed into a coded bitstream which can be decoded by a decoder by transforming a part of the bitstream in to a residual including adding the residuals to the predicted samples. The encoding processes as described with reference to FIG. 3A-3G represents an inloop super-resolution encoding scheme which may be used to improve the coding efficiency of video frames that are difficult to compress on the basis of conventional intra-prediction coding.

Figure 4:
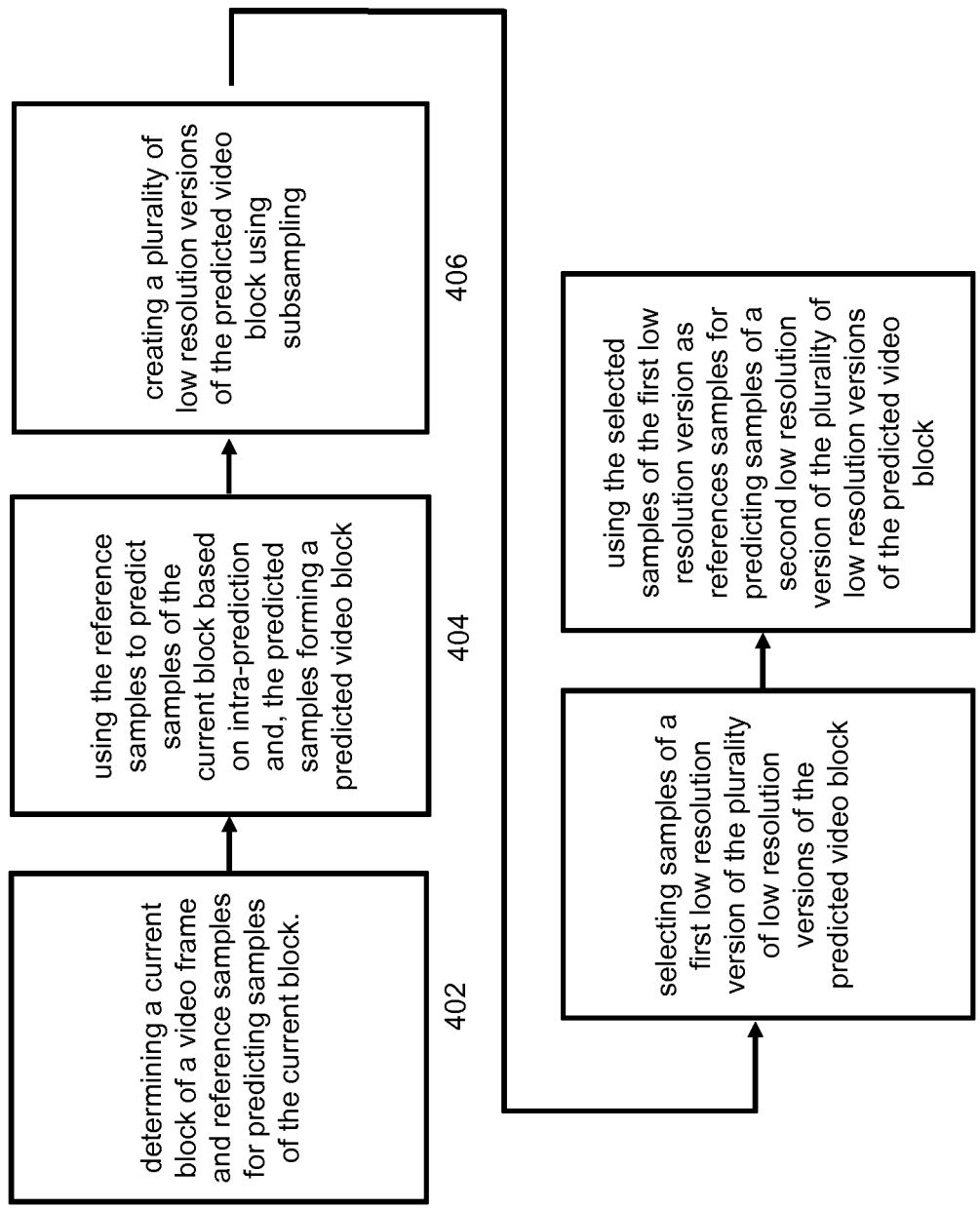
FIG. 4 depicts a flow diagram of an encoding process according to an embodiment of the invention.

FIG. 4 depicts a flow diagram of a prediction method according to an embodiment of the invention. The prediction method may be used in a super-resolution encoding process for video blocks. The encoding process may be used for encoding a single video block of a video frame or a subset of all video blocks of a video frame.

The process may include determining a current block of an original (current) video frame, i.e. video frame that needs to be encoded. Further, reference samples may be determined that are used for predicting samples in the block (step 402). Here, the reference samples may be samples of blocks of the video frame that have been encoded earlier. Samples of the current block may be predicted using intra-prediction and the reference samples (step 404). Here, the predicted samples may define a predicted video block. A plurality of low-resolution versions of the predicted video block may be created using a subsampling scheme (step 406), preferably a polyphase subsampling scheme. Each of the plurality of low-resolution versions may define a low-resolution block and the plurality of low-resolution blocks may include a first low-resolution block and one or more second low-resolution blocks.

Predicted samples of the first low-resolution block may be selected (step 408) and the selected predicted samples may be used to construct references samples for predicting samples of the one or more second low-resolution blocks. The predicted samples of each low-resolution block may be associated with an index, wherein the index may be used to define the coding dependency between the reference samples and predicted samples of the one or more second low-resolution blocks. The process of FIG. 4 provides accurate predicted samples of a high-resolution video block wherein the predicted samples are organized in the form of a plurality of interrelated low-resolution blocks.

The super resolution encoding scheme as e.g. described by FIG. 4 can be used by the encoder in an RDO optimization loop to improve the coding efficiency of video frames that are difficult to compress based on conventional intra-prediction coding.

In the embodiment of FIG. 4, predicted samples of a video block which are predicted based on reference samples using e.g. intra-prediction are downsampled. In a further embodiment, instead of downsampling the predicted samples of the video block, the reference samples belonging to the original video block may be downsampled so that the downsampled reference samples may be used to predict the plurality of low-resolution versions. Such embodiment, is described with reference to FIG. 5A-5D.

FIG. 5A-5D illustrate a method of predicting samples of a block according to another embodiment of the invention. This scheme is similar to the method described with reference to FIG. 3A-3G, including a first step (FIG. 5A) wherein original samples $o_{ij}$ of a current video block 502 are determined in a similar way as described with reference to FIG. 3A. In contrast with the method of FIG. 3A-3G, in this case the reference samples $r_i$ are downsampled (FIG. 5B) using a downsampling scheme and the downsampled reference samples (in this case $r_0, r_3, r_4, r_8$) are used to compute the samples of the first low-resolution block (FIG. 5C). The samples of the first low-resolution block may be used to predict samples of one or more second low-resolution blocks as illustrate in FIG. 5D. To that end, a reconstruction step 517 may be applied to the predicted samples of the first low-resolution block in order to determine a first low resolution block of reconstructed samples. These reconstructed samples may be used in a second prediction scheme 518 as reference samples for determining predictions for one or more second low-resolution blocks, in this case three low-resolution blocks that are associated with the second, third and fourth spatial subsampling lattice of the polyphase downsampling scheme as illustrated in FIG. 5D.

Figures 3F, 3G:
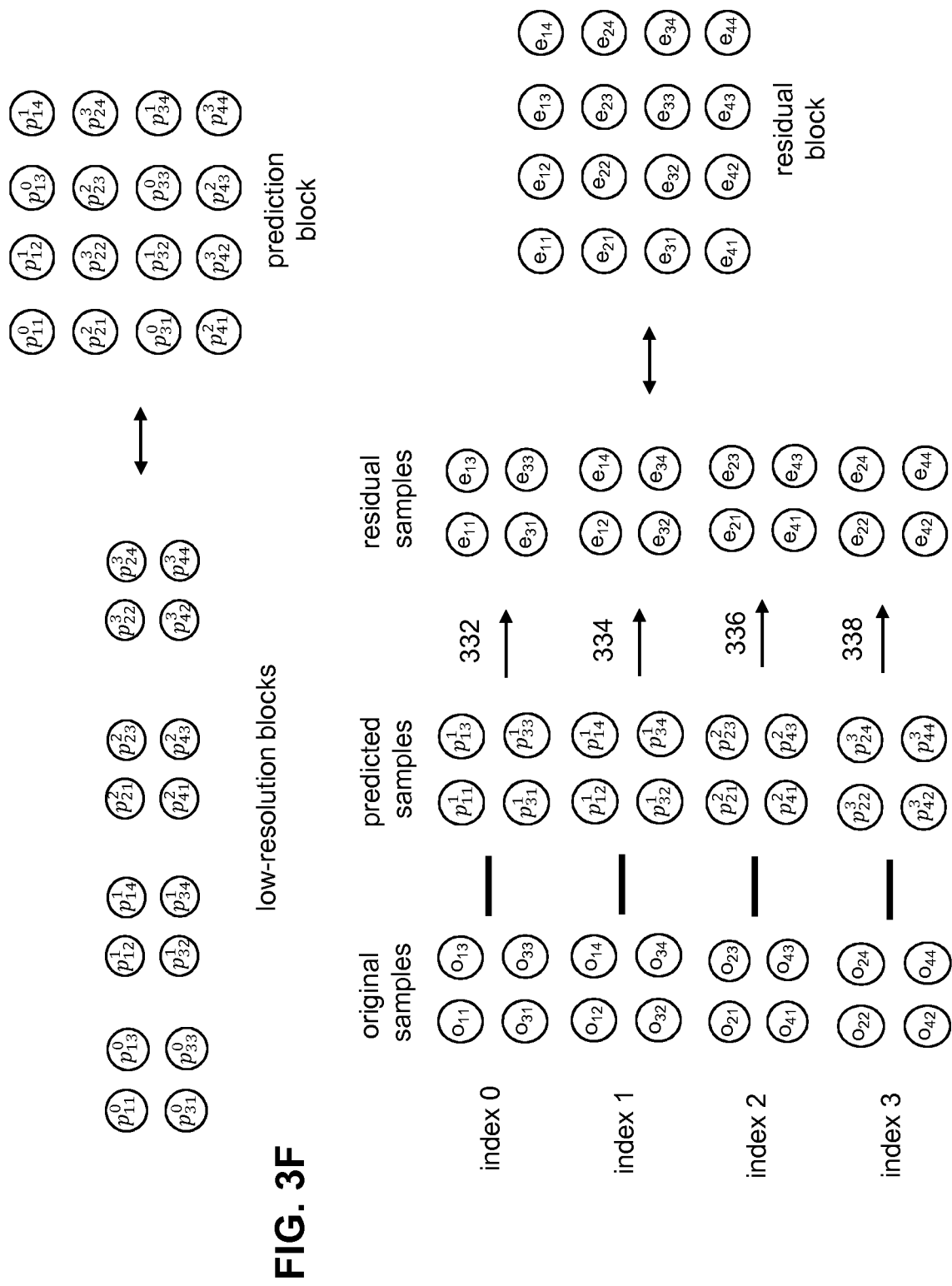

Thereafter, the process may be continued based on the steps as illustrated in FIG. 3F (formation of a prediction block) and FIG. 3G (formation of a residual block) wherein the residual samples of the residual block may be transformed into a bitstream.

Figure 6:
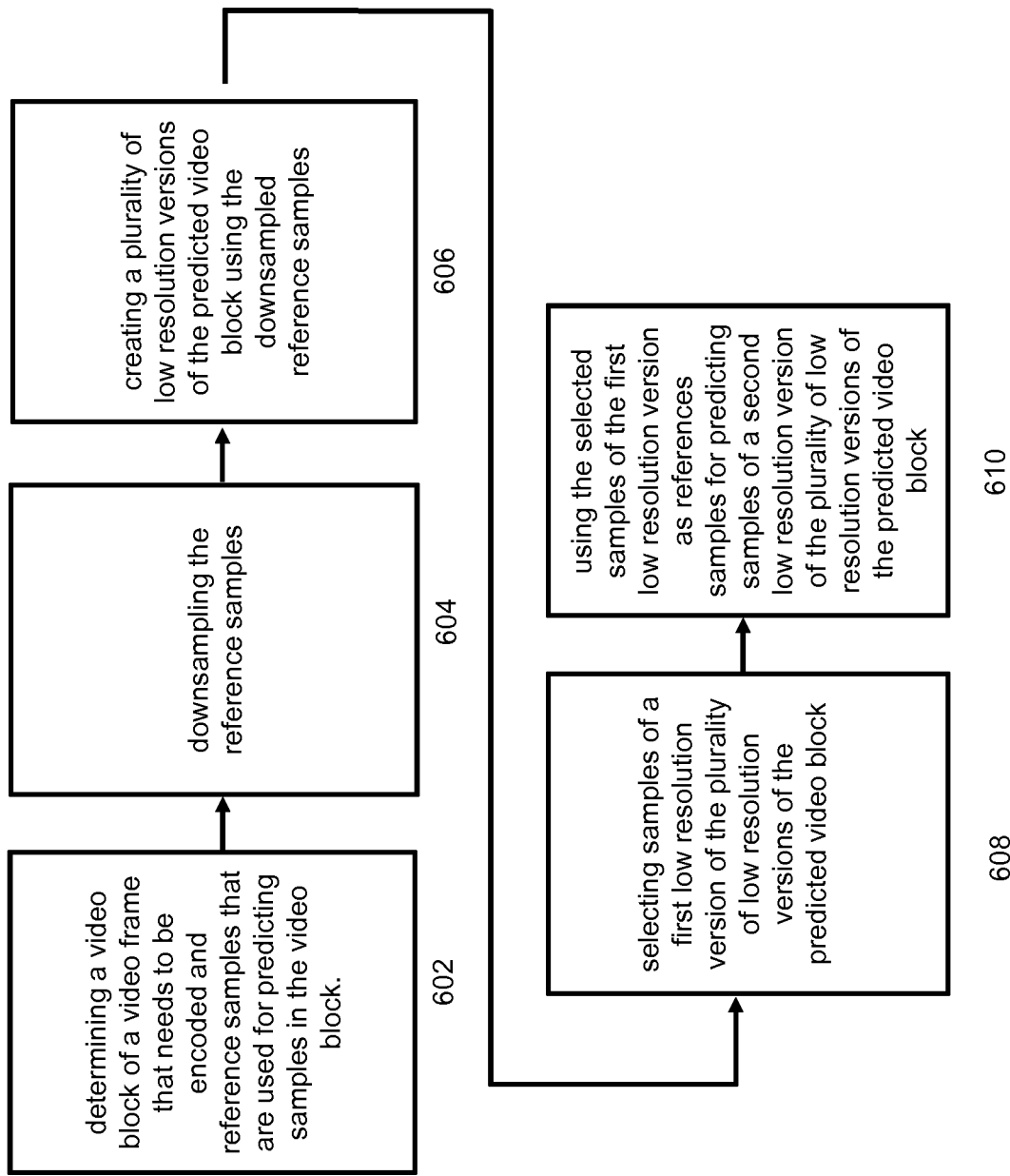
FIG. 6 depicts a flow diagram of an encoding process according to an embodiment of the invention.

FIG. 6 depicts a flow diagram of an encoding method according to an embodiment of the invention. The method may include determining a video block of a video frame that needs to be encoded and reference samples that are used for predicting samples in the video block (step 602). Thereafter, the reference samples may be downsampled using a predetermined downsampling scheme (step 604). The downsampled reference samples may be used to create a plurality of low-resolution versions of the predicted video block (step 606). Predicted samples of the first low-resolution block may be selected (step 608) and the selected predicted samples may be used to construct references samples for predicting samples of the one or more second low-resolution blocks using e.g. a reconstruction step as described in detail with reference to FIG. 3D and FIG. 5D. The predicted samples of each low-resolution block may be associated with an index, wherein the index may be used to define the coding dependency between the reference samples and predicted samples of the one or more second low-resolution blocks.

In the above described encoding schemes, a reconstructed low-resolution block is used a reference for predicting further low resolution blocks. The inloop reconstruction process improves the initial first low block of prediction samples based on the reconstructed residual signal. The samples of the improved low-resolution block may be identified with index 0. The thus generated low resolution block of index 0 may be used for predicting the other low-resolution blocks.

FIG. 7A-7F illustrates part of a method of predicting samples according to a further embodiment of the invention. For predicting further low-resolution blocks based on a first low-resolution block, samples may be obtained using interpolation as depicted in FIG. 7A-7F. Samples of a low-resolution block of index 1 may be computed as a function of the samples of low-resolution block of index 0 as illustrated in FIGS. 7A and 7B:

$$f_1 \rightarrow \widehat{index}_1(i,j) : \frac{index_0(i,j) + index_0(i,j+1)}{2}$$

In a similar way, samples of a low-resolution block of index 2 may be computed as a function of the samples of low-resolution block of index 0 as illustrated in FIGS. 7C and 7D. Thereafter, samples of low-resolution block of index 2 may be used to determine samples of low-resolution block of index 3 as illustrated in FIGS. 7E and 7F. For the edge case, i.e. j=1 the function may be defined as follows be:

$$f_1 \rightarrow \widehat{index}_1(i,1) : index_0(i,1)$$

It is understood that many schemes may be used to derive the samples of the low-resolution bocks of index 1, ... N based on the samples of low-resolution block of index 0. A more general expression for determining samples of the low-resolution blocks is provided below wherein, $k \in \{1,3\}$ and $(m, n) \in \{0,3\}^2$:

$$\begin{cases} \widehat{index}_k(i,j) = f_k(index_0(m,n)) \\ e_k(i,j) = \widehat{index}_k(i,j) - index_k(i,j) \end{cases}$$

In another embodiment, the function may not be an analytical function but the result of an algorithm such as machine learning-based, neural network-based, etc. Further, the order of the prediction dependency (the coding dependency hierarchy) between index 1 to 3 can vary and does not need to be fixed in increasing order.

Figure 8:
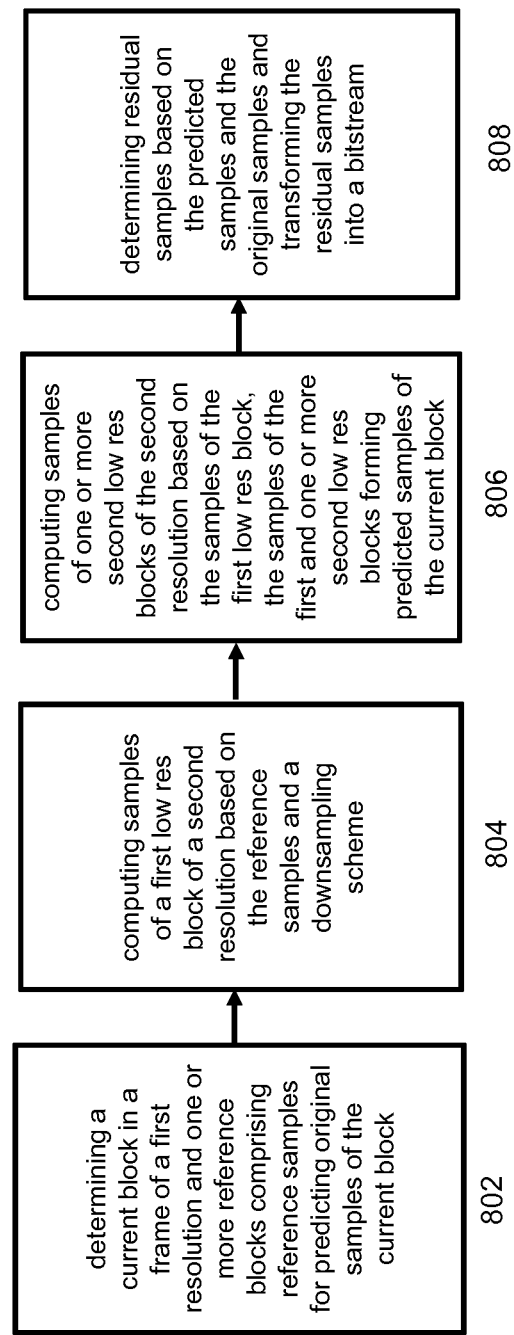
FIG. 8 depicts a flow diagram of a decoding method according to an embodiment of the invention

FIG. 8 describes a method encoding video data into a bitstream, which may include the steps of: determine current block in a frame of a first resolution and one or more reference blocks comprising reference samples for predicting original samples of the current block (step 802). Then, samples of a first low-resolution block of a second resolution may be computed based on the reference samples and a downsampling scheme (step 804). Further, samples of one or more second low-resolution blocks of the second resolution may be computed based on the samples of the first low-resolution block (step 806). Here, the samples of the first and one or more second low-resolution blocks may define the predicted samples of the current block. Finally, residual samples may be determined based on the predicted samples and the original samples and transforming the residual samples into a bitstream (step 808)

Figure 9:
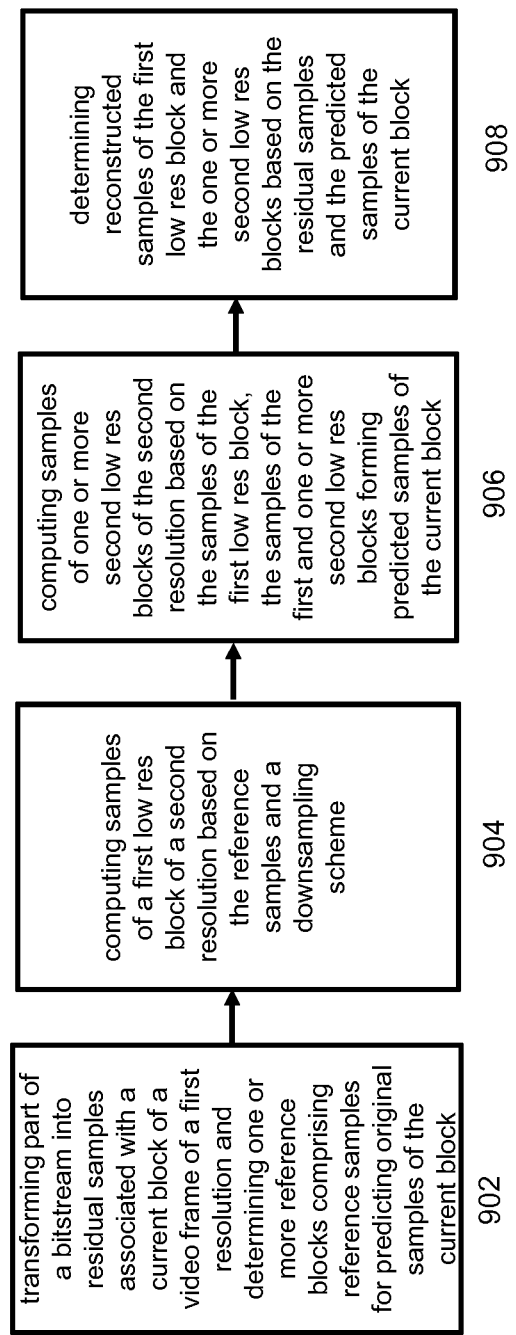
FIG. 9 depicts a flow diagram of a decoding method according to an embodiment of the invention.

FIG. 9 describes a method decoding a bitsteam into video data, which may include the steps of: transforming part of a bitstream into residual samples associated with a current block of a video frame of a first resolution and determining one or more reference blocks comprising reference samples for predicting original samples of the current block (step 910). Then, samples of a first low-resolution block of a second resolution may be computed based on the reference samples and a downsampling scheme (step 912). Samples of one or more second low-resolution blocks of the second resolution may be computed based on the samples of the first low res block (step 914), wherein the samples of the first and one or more second low-resolution blocks may define predicted samples of the current block. Finally, reconstructed samples of the first low-resolution block and the one or more second low-resolution blocks may be determined based on the residual samples and the predicted samples of the current block (step 916).

Figure 10:
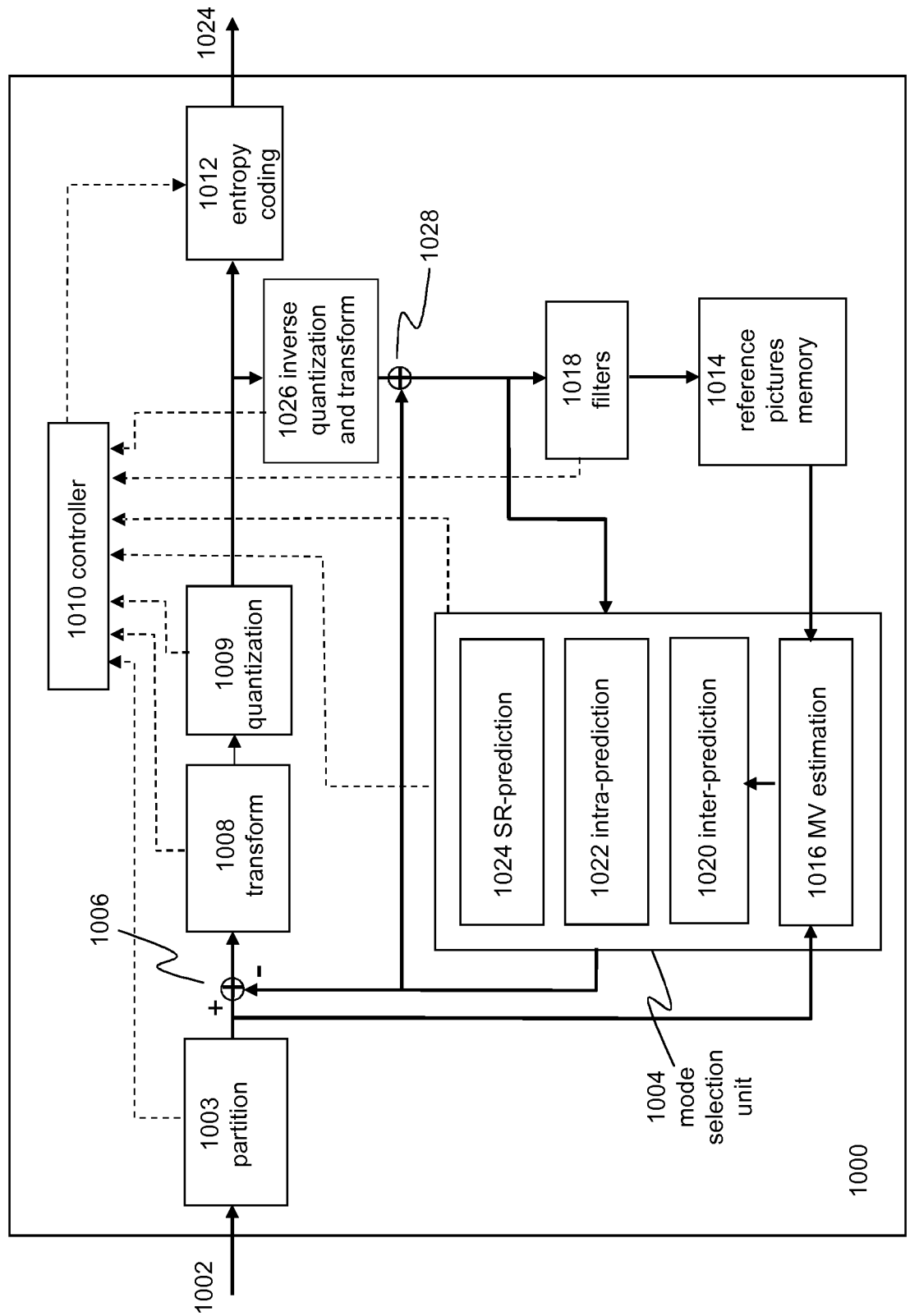
FIG. 10 depicts a block diagram of an encoder apparatus according to an embodiment of the invention.

FIG. 10 is a block diagram illustrating a video encoder including a super resolution mode unit (video block level) according to an embodiment of the invention.

Video encoder 1000 may perform intra- and inter-coding of video blocks within video frames or parts thereof, e.g. video slices. Intra-coding relies on spatial prediction to reduce or remove spatial redundancy in video within a given picture. Inter-coding relies on temporal prediction to reduce or remove temporal redundancy in video within adjacent pictures or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

The video encoder receives video data 1002 to be encoded. In the example of FIG. 10, video encoder 1000 may include a partition unit 1003, a mode select unit 1004, summer 1006, transform unit 1008, quantization unit 1009, entropy encoding unit 1012, and reference picture memory 1014. Mode select unit 1004, in turn, may comprise a motion estimation unit 1016, inter prediction unit 1020, intra prediction unit 1022 and super resolution prediction unit 1024. For video block reconstruction, video encoder 1000 also includes inverse quantization and transform unit 1026, and summer 1028. A filter, such as a deblocking filter 1018 may also be included to filter-out artefacts from the reconstructed video frames. Additional loop filters (in loop or post loop) may also be used in addition to the deblocking filter.

The mode select unit 1004 may select one of the coding modes, intra-prediction, inter-prediction or super resolution prediction, e.g., based on error results, and provides the resulting intra-, inter- or super resolution coded block to summer 1006 to generate a block of residual video data and to summer 1028 to reconstruct the encoded block for use as a reference picture. During the encoding process, video encoder 1000 receives a picture or slice to be coded. The picture or slice may be divided into multiple video blocks. The inter-prediction unit in the mode selection unit may perform inter-predictive coding of the received video block relative to one or more blocks in one or more reference pictures to provide temporal compression. Further, the intra-prediction unit in the mode selection unit may perform intra-predictive coding of the received video block relative to one or more neighbouring blocks in the same picture or slice as the block to be coded to provide spatial compression. Further, the super resolution-prediction unit 1024 in the mode selection unit may perform super resolution coding of the received video block based on downsampling of a video block into multiple low resolution video blocks and encoding the plurality of low-resolution video blocks based on predictive coding as described with reference to the embodiments in this application. Video encoder may perform multiple coding passes, e.g., to select an appropriate coding mode for each block of video data.

The partition unit 1003 may partition blocks of video data into sub-blocks, based on evaluation of previous partitioning schemes in previous coding passes. For example, the partition unit may initially partition a picture or slice into LCUs, and partition each of the LCUs into sub-CUs based on rate-distortion analysis (e.g., rate-distortion optimization). The partitioning unit may further produce a quadtree data structure indicative of partitioning of an LCU into sub-CUs. Leaf-node CUs of the quadtree may include one or more PUs and one or more TUs.

The motion vector estimation unit 1016 executes a process of calculating motion vectors for video blocks. A motion vector, for example, may indicate the displacement of a predictive block (a prediction unit or PU) of a video block within a current picture relative to a predictive block within a reference picture (or other coded unit) relative to the current block being coded within the current picture (or other coded unit). Motion estimation unit calculates a motion vector for a PU of a video block in an inter-coded slice by comparing the position of the PU to the position of a predictive block of a reference picture approximating the pixel values of the video block. Accordingly, in general, data for a motion vector may include a reference picture list, an index into the reference picture list (ref_idx), a horizontal component, and a vertical component. The reference picture may be selected from a first reference picture list (List 0), a second reference picture list (List 1), or a combined reference picture list (List c), each of which identify one or more reference pictures stored in reference picture memory 1014.

MV motion estimation unit 1016 may generate and send a motion vector that identifies the predictive block of the reference picture to the entropy encoding unit and the inter-prediction unit. That is, the motion estimation unit may generate and send motion vector data that identifies the reference picture list containing the predictive block, an index into the reference picture list identifying the picture of the predictive block, and a horizontal and vertical component to locate the predictive block within the identified picture.

In some examples, rather than sending the actual motion vector for a current PU, a motion vector prediction unit may predict the motion vector to further reduce the amount of data needed to communicate the motion vector. In that case, rather than encoding and communicating the motion vector itself, motion vector prediction unit may generate a motion vector difference (MVD) relative to a known (or knowable) motion vector.

The motion vector prediction unit may build a motion vector predictor candidate list that includes several neighbouring blocks in spatial and/or temporal directions as candidates for MVP. When multiple motion vector predictor candidates are available (from multiple candidate blocks), motion vector prediction unit may determine a motion vector predictor for a current block according to predetermined selection criteria. For example, motion vector prediction unit may select the most accurate predictor from the candidate set based on analysis of encoding rate and distortion (e.g., using a rate-distortion cost analysis or other coding efficiency analysis). In other examples, motion vector prediction unit may generate an average of the motion vector predictor candidates. Other methods of selecting a motion vector predictor are also possible.

Upon selecting a motion vector predictor, motion vector prediction unit may determine a motion vector predictor index (mvp_flag), which may be used to inform a video decoder where to locate the MVP in a reference picture list containing MVP candidate blocks. Motion vector prediction unit may also determine the MVD between the current block and the selected MVP. The MVP index and MVD may be used to reconstruct the motion vector.

Typically, the partition unit and mode selection unit, including the intra- and inter-prediction unit, the motion vector estimation unit may be highly integrated, but are illustrated separately for conceptual purposes.

Adder 1006 of the video encoder may be used to form a residual video block by subtracting a predicted video block (as identified by a motion vector) received from the mode select unit from the original video block being coded.

The transform processing unit 1008 may be used to apply a transform, such as a discrete cosine transform (DCT) or a conceptually similar transform, to the residual video block in order to form a block of residual transform coefficient values. The transform processing unit may be used to perform other transforms which are conceptually similar to DCT. Wavelet transforms, integer transforms, sub-band transforms or other types of transforms could also be used. In any case, transform processing unit applies the transform to the residual block, producing a block of residual transform coefficients. The transform may convert the residual information from a pixel value domain to a transform domain, such as a frequency domain. Transform processing unit may send the resulting transform coefficients to the quantization unit 1009, which quantizes the transform coefficients to further reduce bit rate. The quantization process may reduce the bit depth associated with some or all of the coefficients. The degree of quantization may be modified by adjusting a quantization parameter.

A controller 1010 may provide syntax elements (metadata), such as motion vectors, intra-mode indicators, partition information, and other such syntax information, to the entropy coding unit. Entropy coding unit then encodes the quantized transform coefficients and the syntax elements. For example, entropy coding unit may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighbouring blocks. Following the entropy coding by entropy coding unit, the encoded bitstream may be transmitted to another device (e.g., a video decoder) or stored for later transmission or retrieval.

The inverse quantization and inverse transform unit 1026 may apply inverse quantization and inverse transformation, respectively, to reconstruct the residual block in the pixel domain, e.g., for later use as a reference block. The inter-prediction unit may calculate a reference block by adding the residual block to a predictive block of one of the pictures of reference picture memory 1014. Inter-prediction unit may also apply one or more interpolation filters to the reconstructed residual block to calculate sub-integer pixel values for use in motion estimation. The reconstructed residual block is added to the prediction block produced by the inter-prediction unit to produce a reconstructed video block for storage in the reference picture memory. The reconstructed video block may be used by the motion vector estimation unit and inter-prediction unit as a reference block to inter-code a block in a subsequent picture.

The encoder may perform a known rate-distortion optimisation (RDO) process in order to find the best coding parameters for coding blocks in a picture. Here, the best coding parameters (including mode decision; intra prediction mode estimation; motion estimation; and quantization) refer to the set of parameters that provide the best trade-off between a number of bits used for encoding a block versus the distortion that is introduced by using the number of bits for encoding. The term rate-distortion optimization is sometimes also referred to as RD optimization or simply "RDO". RDO schemes that are suitable for AVC and HEVC type coding standards are known as such, see for example, Sze, Vivienne, Madhukar Budagavi, and Gary J. Sullivan. "*High efficiency video coding (HEVC)*." Integrated Circuit and Systems, Algorithms and Architectures. Springer (2014): 1-375; Section: 9.2.7 RD Optimization. RDO can be implemented in many ways. In one well-known implementation, the RDO problem can be expressed as a minimization of a Lagrangian cost function J with respect to a Lagrangian multiplier $\lambda$: $\min_{(coding\ parameters)} J = (D + \lambda * R)$. Here, the parameter R represents the rate (i.e. the number of bits required for coding) and the parameter D represents the distortion of the video signal that is associated with a certain rate R. The distortion D may be regarded a measure of the video quality. Known metrics for objectively determining the quality (objectively in the sense that the metric is content agnostic) include means-squared error (MSE), peak-signal-to-noise (PSNR) and sum of absolute differences (SAD).

In the context of HEVC, the rate-distortion cost may require that the video encoder computes a predicted video block using each of the available prediction modes, including the super resolution mode as described in this application. The video encoder then determines a difference between each of the predicted blocks and the current block (i.e. the residual block of a residual video frame) and transforms each of the residual block from the spatial domain to the frequency domain. Next, the video encoder may quantize each of the transformed residual blocks to generate corresponding encoded video blocks. The video encoder may decode the encoded video blocks and compare each of the decoded video block to the current block to determine a distortion metric D. Moreover, this full rate-distortion analysis involves computing the rate R for each of the prediction modes, i.e. the number of bits used to signal each of the encoded video blocks. The thus determined RD costs are then used to select a block that provides the best trade-off between a number of bits used for encoding a block versus the distortion that is introduced by using the number of bits for encoding.

Figure 11:
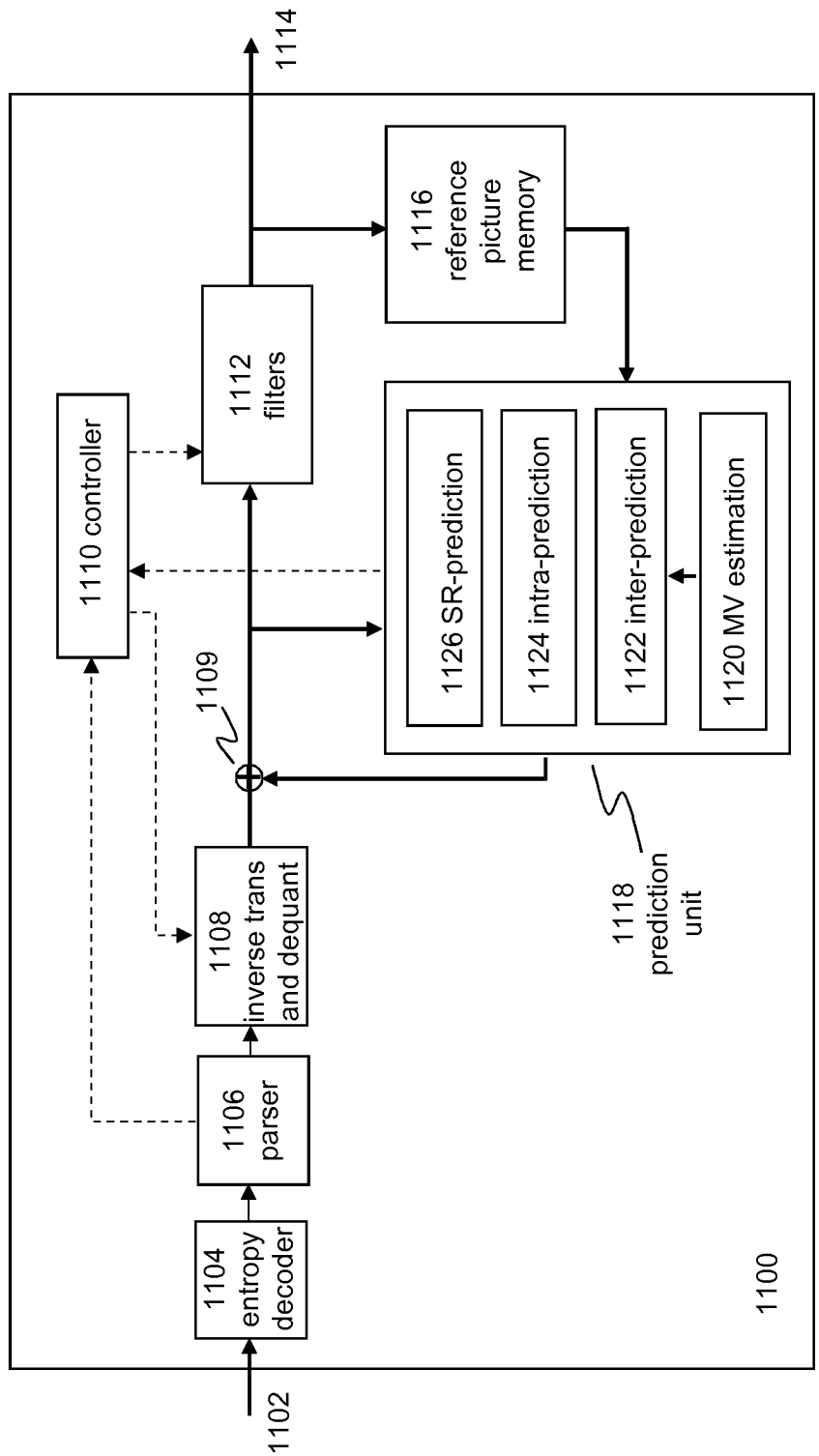
FIG. 11 depicts a block diagram of a decoder apparatus according to an embodiment of the invention.

FIG. 11 is a block diagram illustrating an example video decoder that comprise a super resolution unit (video block level) according to an embodiment of the invention. In the example of FIG. 11, video decoder 1100 includes an entropy decoding unit 1104, a parser 1106, a prediction unit 1118, an inverse quantization and inverse transformation unit 1108, a summer 1109, and a reference picture memory 1116. The prediction unit may include a motion vector estimation unit 1120, inter-prediction unit 1122, intra-prediction unit 1124 and super resolution prediction unit 1126.

During the decoding process, the video decoder may receive an encoded video bitstream 1102 that represents video blocks of an encoded video slice and associated syntax elements from a video encoder. The entropy decoding unit may decode the bitstream to generate quantized coefficients, motion vectors, and other syntax elements. The parser unit may forward the motion vectors and other syntax elements to the prediction unit.

The syntax elements may be received at video slice level and/or video block level. For example, the video decoder may receive compressed video data that has been compressed for transmission via a network into so-called network abstraction layer (NAL) units. Each NAL unit may include a header that identifies a type of data stored to the NAL unit. There are two types of data that are commonly stored to NAL units. The first type of data stored to a NAL unit is video coding layer (VCL) data, which includes the compressed video data. The second type of data stored to a NAL unit is referred to as non-VCL data, which includes additional information such as parameter sets that define header data common to a large number of NAL units and supplemental enhancement information (SEI).

When the video slice is coded as an intra-coded (I) slice, the intra-prediction unit of the prediction unit may generate prediction data for a video block of the current video slice based on a signalled intra-prediction mode and data from previously decoded blocks of the current picture.

When the video slice is coded on the basis of a super resolution mode, the super resolution prediction unit may generate prediction data for a video block of the current video based on a signalled super resolution mode and data from previously decoded blocks of the current picture. In particular, the super resolution prediction unit may decode video blocks on the basis of prediction coding (e.g. intra and/or inter prediction coding) into a plurality of low-resolution video blocks and reconstruct high resolution video blocks on the basis of the plurality of low resolution video blocks using a super resolution technique.

When the picture is coded as an inter-coded (e.g. B or P) slice, the inter-prediction unit of the prediction unit may produce predictive blocks for a video block of the current video slice based on the motion vectors and other syntax elements received from the entropy decoding unit. The predictive blocks may be produced from one of the reference pictures within one of the reference picture lists. The video decoder may construct the reference picture using well known construction techniques based on reference pictures stored in the reference picture memory.

The inter-prediction unit 1122 may determine prediction information for a video block of the current video slice by parsing the motion vectors and other syntax elements and uses the prediction information to produce the predictive blocks for the current video block being decoded. For example, inter-prediction unit uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice. In some examples, inter-prediction unit may receive certain motion information from motion vector prediction unit (not shown).

Motion vector prediction unit may use an MVP or index to identify the motion information used to predict the motion vector of a current block. Motion vector prediction unit may combine the identified MVP with a received MVD to determine the motion vector for the current block. After determining motion information for the current block, motion vector prediction unit may generate the predictive block for the current block.

The inverse quantization and inverse transform unit 1108 may inverse quantize, i.e., de-quantize, the quantized transform coefficients provided in the bitstream and decoded by entropy decoding unit. The inverse quantization process may include use of a quantization parameter calculated by video encoder for each video block in the video slice to determine a degree of quantization and, likewise, a degree of inverse quantization that should be applied. It may further apply an inverse transform, e.g., an inverse DCT, an inverse integer transform, or a conceptually similar inverse transform process, to the transform coefficients in order to produce residual blocks in the pixel domain.

After the inter-prediction unit generates the predictive block for the current video block based on the motion vectors and other syntax elements, the video decoder forms a decoded video block by summing the residual blocks determined by inverse transform process with the corresponding predictive blocks generated by the inter-prediction unit. The adder 1109 may represent the component or components that perform this summation operation. If desired, a deblocking filter may also be applied to filter the decoded blocks in order to remove blocking artefacts. Other loop filters (either in the coding loop or after the coding loop) may also be used to smooth pixel transitions, or otherwise improve the video quality. The decoded video blocks in a given picture are then stored in reference picture memory 1116, which stores reference pictures used for subsequent motion prediction. Reference picture memory also stores decoded video for later presentation on a display device.

Hence, in the video encoder and video decoder of FIGS. 10 and 11 respectively, the super resolution prediction mode may use a downsampling scheme for downsampling and upsampling at block level, e.g. a single video block or a subset of all video blocks of a video frame (i.e. super resolution modes 1 and 2 of table 1).

A first flag may determine whether a downsampling scheme is used. A second parameter may only be present if a downsampling scheme is used. This second parameter may define the type of downsampling scheme used, for instance polyphase downsampling. It is noted that the syntax is merely an example and many other alternatives can be used, for instance only one flag, longer or shorter bit depth, etc. In addition, and/or alternatively, the signalling can also be inserted in a new SEI message.

In case the super resolution mode is applied to subset of all video blocks in a the frame (e.g. a slice or a tile group) the same syntax provided in table 2 can be used, as a tile is also a slice. In case the super resolution mode is applied to exactly one video block, the metadata for signalling can be inserted in the payload of video block. Table 3 is an example of a modified coding unit payload in HEVC which contains this signalling:

TABLE 2

|  | Descriptor |
| --- | --- |
| coding_unit( x0, y0, log2CbSize ) { | |
| ... | |
|   super_resolution_flag | u(1) |
|   if(super_resolution_flag) { | |
|     super_resolution_type | u(3) |
|   } | |
| ... | |
| } | |

Figure 12:
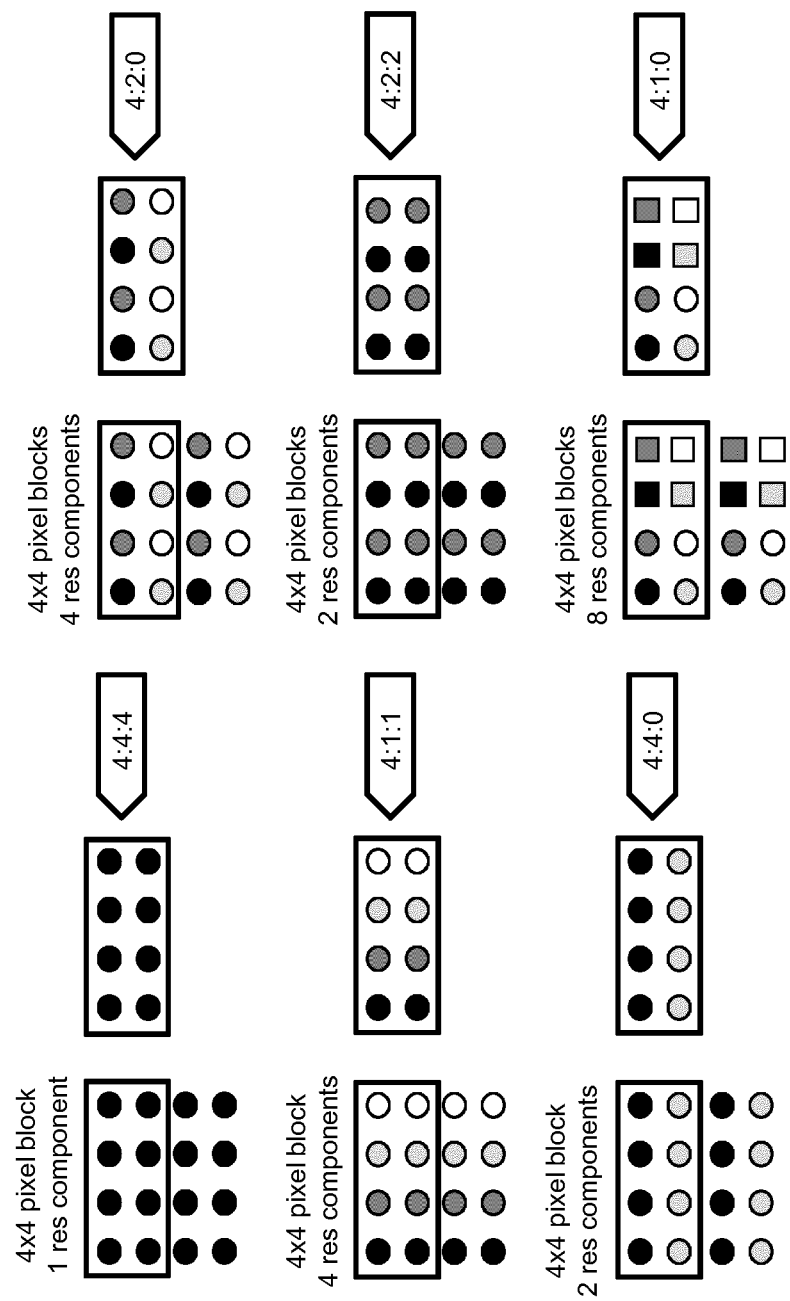
FIG. 12 depicts examples of resolution component formats that may be used in the embodiments described in this disclosure.

FIG. 12 depicts examples of resolution component types that may be used in the embodiments described in this disclosure. For example, the 4:2:0 format corresponds to a polyphase subsampling scheme where one sample of a resolution component may contribute up to 4 pixels of the high-resolution video block (1 to 4 depending on the applied downsampling operation, e.g. polyphase is 1). Similarly, the 4:4:4 format corresponds to a situation wherein the resolution components and the high-resolution video block have the same resolution. In this case there is no spatial subsampling. If the bitstream contains multiple resolution components with the 4:4:4 format, then this is similar to SNR scalability where the reconstructed output frame benefits from a better PSNR but not a higher resolution. Per resolution component format, a given number of resolution components are expected to convey the same full video signal as in the case where there is no spatial subsampling (4:4:4).

TABLE 4

Expected number of resolution components per format

| Resolution component format | Expected number of resolution components |
|---|---|
| 4:1:1 | 4 |
| 4:2:0 | 4 |
| 4:2:2 | 2 |
| 4:4:4 | 1 |
| 4:4:0 | 2 |

Table 4 gives the expected number of resolution components which may form a group of resolution components that can be used to reconstruct the original (high resolution) video signal. The video source that is represented by the bitstream is a sequence of pictures in decoding order, wherein the source and decoded pictures may each comprise one resolution component array wherein each resolution component array may comprise one or more colour sample arrays: Luma (Y) only (monochrome); Luma and two chroma (YCbCr or YCgCo); Green, Blue and Red (GBR, also known as RGB); or, arrays representing other unspecified monochrome or tri-stimulus colour samplings (for example, YZX, also known as XYZ).

In another embodiment, the spatial subsampling scheme is not or not completely predefined. In that case, the upscaling filter, the location of the pixels from the LR video frames and the algorithm to compute the pixels in the HR video frames need to be signalled to the decoder. In a generic way, this information may be signalled in the decoder information e.g. based on a vector per resolution component. In an embodiment, this information may be defined with sub-pixel accuracy, indicating the displacement of the resolution component with respect to an origin, e.g. the top left origin (0,0), in pixel units and an algorithm to compute every pixel value from the HR frame based on a recombination of the video frames of the low-resolution components. In this case, the recombination process may be a super-resolution image reconstruction technique as referred to in this disclosure.

Figure 13:
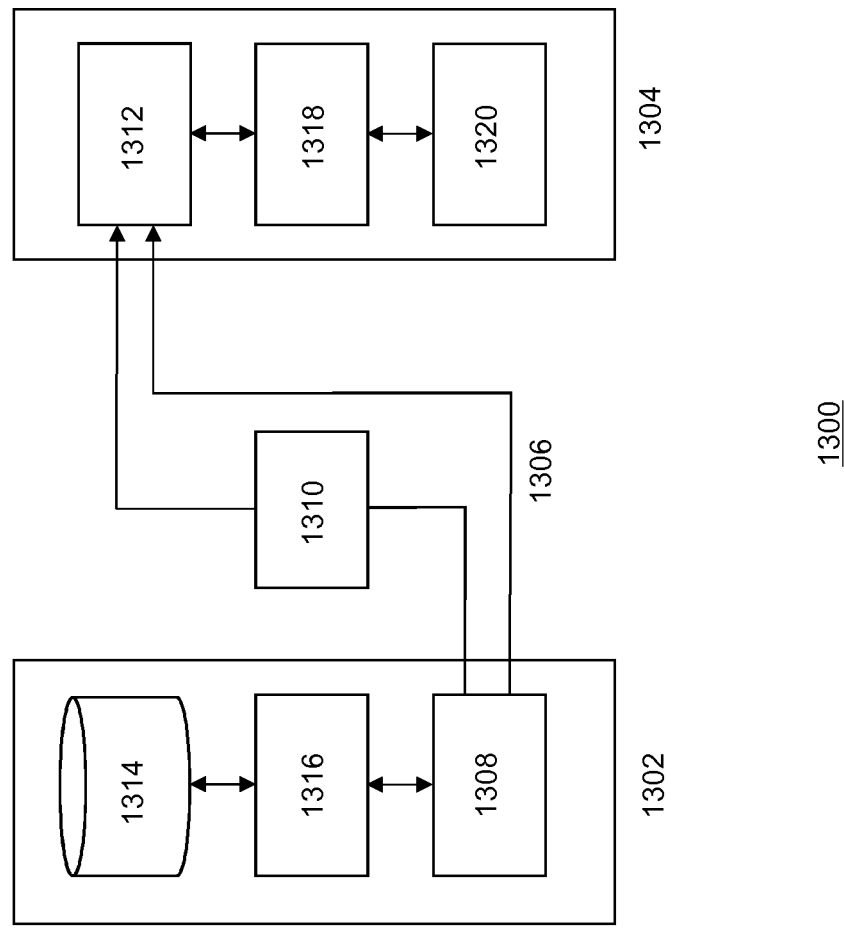
FIG. 13 depicts a block diagram illustrating an exemplary data processing system that may be used in as described in this disclosure.

FIG. 13 depicts a schematic of a video encoding and decoding system 1300 that may use the techniques described in this application. As shown in FIG. 13, system 1300 may include a first video processing device 1302, e.g. a video capturing device or the like, configured to generate encoded video data which may be decoded by a second video processing device 1304, e.g. a video playout device. First and second video processing devices may include any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, The video processing devices may be equipped for wireless communication.

The second video processing device may receive the encoded video data to be decoded through a transmission channel 1306 or any type of medium or device capable of moving the encoded video data from the first video processing device to the second video processing device. In one example, the transmission channel may include a communication medium to enable the first video processing device to transmit encoded video data directly to the second video processing device in real-time. The encoded video data may be transmitted based on a communication standard, such as a wireless communication protocol, to the second video processing device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, servers or any other equipment that may be useful to facilitate communication between first and second video processing devices.

Alternatively, encoded data may be sent via an I/O interface 1308 of the first video processing device to a storage device 1310. Encoded data may be accessed by input an I/O interface 1312 of the second video processing device. Storage device 1310 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may hold the encoded video generated by the first video processing device. The second video processing device may access stored video data from storage device via streaming or downloading. The file server may be any type of server capable of storing encoded video data and transmitting that encoded video data to the second video processing device. Example file servers include a web server (e.g., for a website), an FTP server, network attached storage (NAS) devices, or a local disk drive. The second video processing device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 36 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 1300 may be configured to support one-way or two-way video transmission to support applications such as video streaming, video playback, video broadcasting, and/or video telephony.

In the example of FIG. 13, the first video processing device may further include a video source 1314 and a video encoder 1316. In some cases, I/O interface 1308 may include a modulator/demodulator (modem) and/or a transmitter. The video source may include any type of source such as a video capture device, e.g., a video camera, a video archive containing previously captured video, a video feed interface to receive video from a video content provider, and/or a computer graphics system for generating computer graphics data as the source video, or a combination of such sources. If video source 1314 is a video camera, the first and second video processing device may form so-called camera phones or video phones. However, the techniques described in this disclosure may be applicable to video coding in general, and may be applied to wireless and/or wired applications.

The captured, pre-captured, or computer-generated video may be encoded by video encoder 1316. The encoded video data may be transmitted directly to the second video processing device via I/O interface 1308. The encoded video data may also (or alternatively) be stored onto storage device 1310 for later access by the second video processing device or other devices, for decoding and/or playback.

The second video processing device may further comprise a video decoder 1318, and a display device 1320. In some cases, I/O interface 1312 may include a receiver and/or a modem. I/O interface 1312 of the second video processing device may receive the encoded video data. The encoded video data communicated over the communication channel, or provided on storage device 1310, may include a variety of syntax elements generated by video encoder 1316 for use by a video decoder, such as video decoder 1318, in decoding the video data. Such syntax elements may be included with the encoded video data transmitted on a communication medium, stored on a storage medium, or stored a file server.

Display device 1320 may be integrated with, or external to, the second video processing device. In some examples, second video processing device may include an integrated display device and also be configured to interface with an external display device. In other examples, second video processing device may be a display device. In general, display device displays the decoded video data to a user, and may comprise any of a variety of display devices such as a liquid crystal display (LCD), a plasma display, an organic light emitting diode (OLED) display, or another type of display device.

Video encoder 1316 and video decoder 1318 may operate according to a video compression standard, such as the High Efficiency Video Coding (HEVC), VP9 or AV1. Alternatively, video encoder and video decoder may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard.

Although not shown in FIG. 13, in some aspects, video encoder 1316 and video decoder 1318 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 1316 and video decoder 1318 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 1316 and video decoder 1318 may be included in one or more encoders or decoders, either of which may be integrated as part of a combined encoder/decoder (CODEC) in a respective device.

This disclosure may generally refer to video encoder "signalling" certain information to another device, such as video decoder. The term "signalling" may generally refer to the communication of syntax elements and/or other data (metadata) used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of encoding a block of a video frame into a bitstream, the method comprising:

a processor of an encoder apparatus determining a set of original samples of a current block that needs to be encoded and determining reference samples of one or more reconstructed blocks, each of the one or more reconstructed blocks being encoded and subsequently decoded, the current block and the reconstructed blocks being part of the video frame, the video frame having a first resolution;

the processor determining a subset of original samples based on the set of original samples and a downsampling scheme based on a spatial sampling lattice of the downsampling scheme;

the processor determining first predicted samples based on the reference samples, the first predicted samples forming a first low-resolution prediction block having a second resolution that is lower than the first resolution, the first predicted samples defining predictions for the subset of original samples;

the processor determining second predicted samples of one or more second low-resolution prediction blocks based on the first predicted samples, each of the one or more second low-resolution prediction blocks being of the second resolution, the first predicted samples and one or more second predicted samples forming predicted samples of the current block;

the processor determining residual samples of a residual block based on the set of original samples and the predicted samples of the current block; and the processor transforming the residual samples into the bitstream, the bitstream including metadata for signaling a decoder apparatus that a downsampling scheme was used during the encoding of the current block.

2. The method according to claim 1, wherein determining first predicted samples based on the reference samples comprises:

determining candidate predicted samples for the subset of original samples based on a functional relation between one or more of the reference samples;

determining residual samples of a first low-resolution residual block based on the original samples of the current block and the candidate predicted samples; and determining reconstructed samples of the first low-resolution block based on the residual samples of the low-resolution residual block and the candidate predicted samples, the reconstructed samples defining the first predicted samples.

3. The method according to claim 2, wherein the functional relation between one or more of the reference samples is determined based on an intra-prediction mode of a video coding standard or based on a prediction algorithm the prediction algorithm being one of a machine learning algorithm or an algorithm based on a trained neural network.

4. The method according to any of claim 1, wherein determining second predicted samples of one or more second low-resolution prediction blocks based on the first predicted samples comprises:

determining a predicted sample of one of the one of more second low-resolution blocks based on an interpolation algorithm and at least part of the first predicted samples.

5. The method according to claim 1, wherein the metadata includes a type of metadata, the type of metadata being at least one of: (i) one or more first parameters for signaling a decoder apparatus that predicted samples of the current block are determined based on a predetermined downsampling scheme; (ii) one or more second parameters for signaling a decoder apparatus how predicted samples of the current block are determined based on the reference samples; or (iii) one or more third parameters for signaling a decoder apparatus how the predicted samples of one or more second low-resolution blocks are determined based on the predicted samples of the first low resolution block.

6. The method according to claim 1, wherein the video frame is at least one of an intra-predicted (I) frame, an inter-predicted (P) frame, a bidirectional predicted (B) frame, or a super frame.

7. The method according to claim 1, wherein the bitstream is at least one of a High Efficiency Video Coding (HEVC) based bitstream, an Alliance for Open Media Video (AV1) based bitstream, or a Versatile Video Coding (VVC) based bitstream.

8. A method of decoding a bitstream into of a block of a video frame, the method comprising:

a processor of a decoder apparatus receiving the bitstream, the bitstream comprising encoded residual samples of a residual block, the residual samples being associated with a set of original samples of a current block, the current block being part of the video frame of a first resolution; the bitstream further comprising metadata associated with the encoded residual samples of a residual block for signaling the decoder apparatus that a downsampling scheme was used during encoding of the current block;

the processor determining first predicted samples of a first low-resolution prediction block based on the downsampling scheme based on a spatial sampling lattice of the downsampling scheme, and reference samples of one or more reconstructed blocks, each of the one or more reconstructed blocks being encoded and subsequently decoded, the first low-resolution prediction block having a second resolution that is lower than the first resolution;

the processor determining second predicted samples of one or more second low-resolution prediction blocks based on the first predicted samples, each of the one or more second low-resolution prediction blocks being of the second resolution;

the processor determining predicted samples of the current block based on the first predicted samples of the first low-resolution block and the second predicted samples of the one or more second low-resolution blocks; and the processor determining reconstructed samples of the current block based on the predicted samples of the current block and the residual samples.

9. The method according to claim 8, wherein determining first predicted samples based on the reference samples comprises:

determining candidate predicted samples for the subset of original samples based on a functional relation between one or more of the reference samples;

determining residual samples of a first low-resolution residual block based on the original samples of the current block and the candidate predicted samples; and determining reconstructed samples of the first low-resolution block based on the residual samples of the low-resolution residual block and the candidate predicted samples, the reconstructed samples defining the first predicted samples.

10. The method according to claim 9, wherein the functional relation between one or more of the reference samples is determined based on an intra-prediction mode of a video coding standard or based on an prediction algorithm the prediction algorithm being one of a machine learning algorithm or an algorithm based on a trained neural network.

11. The method according to any of claim 8, wherein determining second predicted samples of one or more second low-resolution prediction blocks based on the first predicted samples comprises:

determining a predicted sample of one of the one of more second low-resolution blocks based on interpolation of at least part of the first predicted samples.

12. The method according to claim 8, wherein the metadata includes a type of metadata, the type of metadata being at least one of: (i) one or more first parameters for signaling a decoder apparatus that predicted samples of the current block are determined based on a predetermined downsampling scheme; (ii) one or more second parameters for signaling a decoder apparatus how predicted samples of the current block are determined based on the reference samples; or (iii) one or more third parameters for signaling a decoder apparatus how the predicted samples of one or more second low-resolution blocks are determined based on the predicted samples of the first low resolution block.

13. The method according to claim 8, wherein the bitstream is at least one of a High Efficiency Video Coding (HEVC) based bitstream, an Alliance for Open Media Video (AV1) based bitstream, or a Versatile Video Coding (VVC) based bitstream.

14. An apparatus for encoding a block of a video frame into a bitstream, the apparatus comprising:
  a processor and memory storing computer-readable instructions that, when executed by the processor, cause the apparatus to carry out operations including:
  determining a set of original samples of a current block that needs to be encoded and determining reference samples of one or more reconstructed blocks, each of the one or more reconstructed blocks being encoded and subsequently decoded, the current block and the reconstructed blocks being part of the video frame, the video frame having a first resolution;
  determining a subset of original samples based on the set of original samples and a downsampling scheme based on a spatial sampling lattice of the downsampling scheme;
  determining first predicted samples based on the reference samples, the first predicted samples forming a first low-resolution prediction block having a second resolution that is lower than the first resolution, the first predicted samples defining predictions for the subset of original samples;
  determining second predicted samples of one or more second low-resolution prediction blocks based on the first predicted samples, each of the one or more second low-resolution prediction blocks being of the second resolution;
  determining residual samples of a residual block based on the set of original samples and the first and second predicted samples; and
  transforming the residual samples into the bitstream, the bitstream including metadata for signaling a decoder apparatus that a downsampling scheme was used during the encoding of the current block.

15. An apparatus for decoding a bitstream into a block of a video frame, the apparatus comprising:
  a processor and memory storing computer-readable instructions that, when executed by the processor, cause the apparatus to carry out operations including:
  receiving the bitstream, the bitstream comprising encoded residual samples of a residual block, the residual samples being associated with a set of original samples of a current block, the current block being part of the video frame of a first resolution; the bitstream further comprising metadata associated with the encoded residual samples of a residual block for signaling the decoder apparatus that a downsampling scheme was used during encoding of the current block;
  determining first predicted samples of a first low-resolution prediction block based on the downsampling scheme based on a spatial sampling lattice of the downsampling scheme, and reference samples of one or more reconstructed blocks, each of the one or more reconstructed blocks being encoded and subsequently decoded, the first low-resolution prediction block having a second resolution that is lower than the first resolution;
  determining second predicted samples of one or more second low-resolution prediction blocks based on the first predicted samples, each of the one or more second low-resolution prediction blocks being of the second resolution;
  determining predicted samples of the current block based on the first predicted samples of the first low-resolution block and the second predicted samples of the one or more second low-resolution blocks; and
  determining reconstructed samples of the current block based on the predicted samples of the current block and the residual samples.

16. A non-transitory computer-readable storage medium having instructions stored thereon that, when executed by a processor of an apparatus, cause the apparatus to carry out operations including:
  determining a set of original samples of a current block that needs to be encoded and determining reference samples of one or more reconstructed blocks, each of the one or more reconstructed blocks being encoded and subsequently decoded, the current block and the reconstructed blocks being part of the video frame, the video frame having a first resolution;
  determining a subset of original samples based on the set of original samples and a downsampling scheme based on a spatial sampling lattice of the downsampling scheme;
  determining first predicted samples based on the reference samples, the first predicted samples forming a first low-resolution prediction block having a second resolution that is lower than the first resolution, the first predicted samples defining predictions for the subset of original samples;
  determining second predicted samples of one or more second low-resolution prediction blocks based on the first predicted samples, each of the one or more second low-resolution prediction blocks being of the second resolution, the first predicted samples and one or more second predicted samples forming predicted samples of the current block;
  determining residual samples of a residual block based on the set of original samples and the predicted samples of the current block; and
  transforming the residual samples into a bitstream, the bitstream including metadata for signaling a decoder apparatus that a downsampling scheme was used during the encoding of the current block.

17. A non-transitory computer-readable storage medium having instructions stored thereon that, when executed by a processor of an apparatus, cause the apparatus to carry out operations including:
  receiving a bitstream, the bitstream comprising encoded residual samples of a residual block, the residual samples being associated with a set of original samples of a current block, the current block being part of the video frame of a first resolution; the bitstream further comprising metadata associated with the encoded residual samples of a residual block for signaling the decoder apparatus that a downsampling scheme was used during encoding of the current block;
  determining first predicted samples of a first low-resolution prediction block based on the downsampling scheme based on a spatial sampling lattice of the downsampling scheme, and reference samples of one or more reconstructed blocks, each of the one or more reconstructed blocks being encoded and subsequently decoded, the first low-resolution prediction block having a second resolution that is lower than the first resolution;

determining second predicted samples of one or more second low-resolution prediction blocks based on the first predicted samples, each of the one or more second low-resolution prediction blocks being of the second resolution;

determining predicted samples of the current block based on the first predicted samples of the first low-resolution block and the second predicted samples of the one or more second low-resolution blocks; and determining reconstructed samples of the current block based on the predicted samples of the current block and the residual samples.

* * * * *